United States Patent
Asakura

(10) Patent No.: US 9,832,327 B2
(45) Date of Patent: Nov. 28, 2017

(54) COMMUNICATION APPARATUS

(71) Applicant: Brother Kogyo Kabushiki Kaisha, Nagoya-shi, Aichi-ken (JP)

(72) Inventor: Hirotaka Asakura, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/850,571

(22) Filed: Sep. 10, 2015

(65) Prior Publication Data

US 2016/0080591 A1 Mar. 17, 2016

(30) Foreign Application Priority Data

Sep. 11, 2014 (JP) ................................. 2014-184828

(51) Int. Cl.
- *G06F 15/00* (2006.01)
- *H04N 1/00* (2006.01)
- *H04W 76/02* (2009.01)
- *H04W 4/00* (2009.01)
- *G06F 3/12* (2006.01)
- *H04W 84/20* (2009.01)

(52) U.S. Cl.
CPC .......... *H04N 1/00307* (2013.01); *G06F 3/12* (2013.01); *H04W 4/008* (2013.01); *H04W 76/023* (2013.01); *H04W 84/20* (2013.01)

(58) Field of Classification Search
CPC ... H04N 1/00307; G06K 15/102; G06K 15/12
USPC ........................................................ 358/1.15
See application file for complete search history.

(56) References Cited

U.S. PATENT DOCUMENTS

| 8,892,030 | B2 | 11/2014 | Nogawa | |
|---|---|---|---|---|
| 9,088,863 | B2 | 7/2015 | Suzuki et al. | |
| 2012/0320414 | A1* | 12/2012 | Shibata | H04W 8/005 358/1.15 |
| 2012/0322498 | A1 | 12/2012 | Nogawa | |

(Continued)

FOREIGN PATENT DOCUMENTS

| JP | 2013-005188 A | 1/2013 |
|---|---|---|
| JP | 2013-214802 A | 10/2013 |

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Mark Milia
(74) *Attorney, Agent, or Firm* — Banner & Witcoff, Ltd.

(57) ABSTRACT

A communication apparatus may perform: in a case where an operation state of a communication apparatus is a second state, determining a termination timing of a maintenance period for maintaining the operation state of the communication apparatus in the second state; when the termination timing arrives, changing the operation state from the second state into a first state; in a case where a first wireless network to which both the communication apparatus and a particular external apparatus belong is formed before the termination timing arrives, executing a wireless communication of target data with the particular external apparatus via a first interface by using the first wireless network; detecting a predetermined instruction; and when the predetermined instruction is detected before the termination timing arrives, extending the termination timing so as to determine a new termination timing of the maintenance period.

19 Claims, 9 Drawing Sheets

(56) References Cited

U.S. PATENT DOCUMENTS

2013/0260682 A1 10/2013 Suzuki et al.
2014/0342765 A1 11/2014 Nogawa

* cited by examiner (Case A)

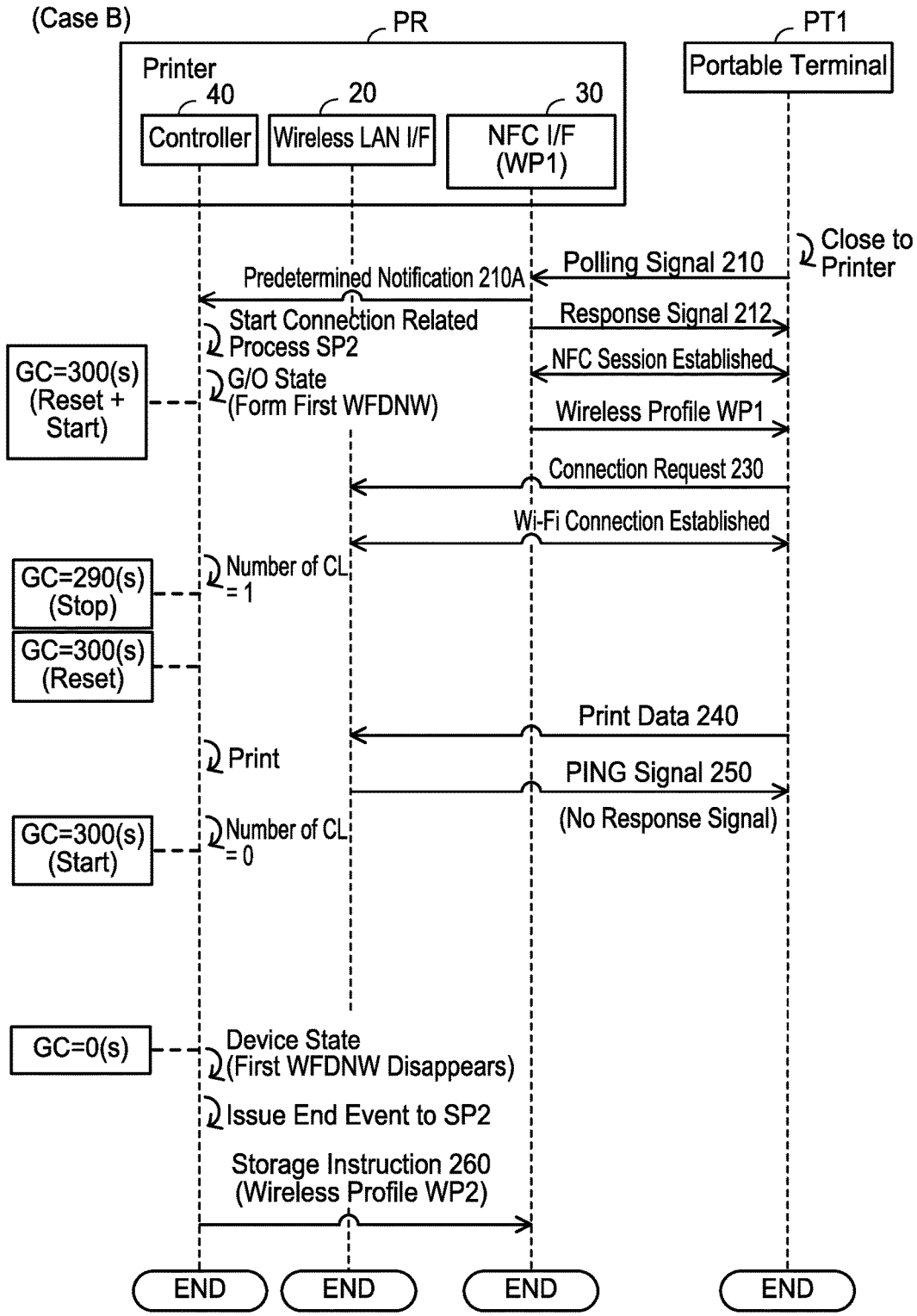

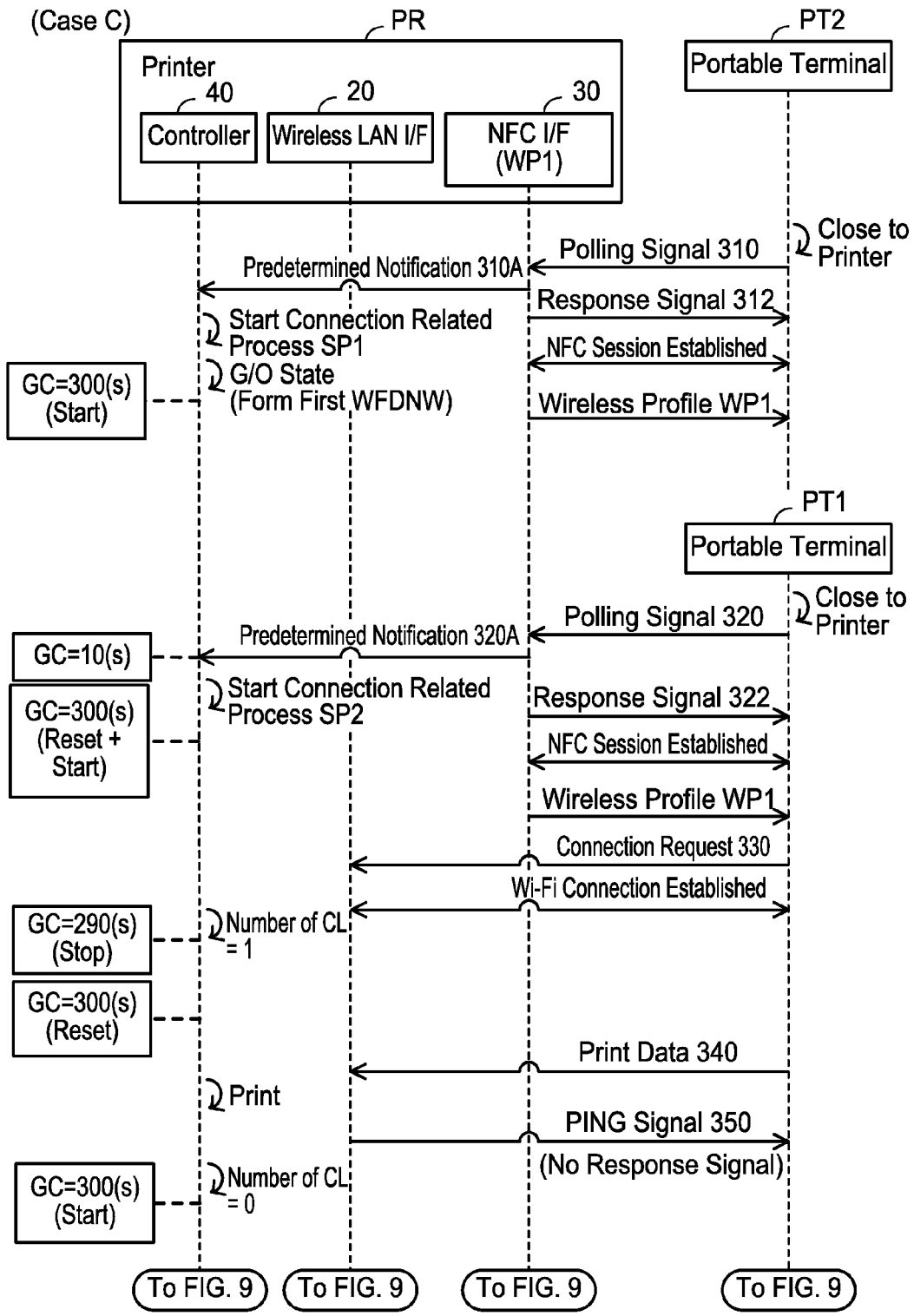

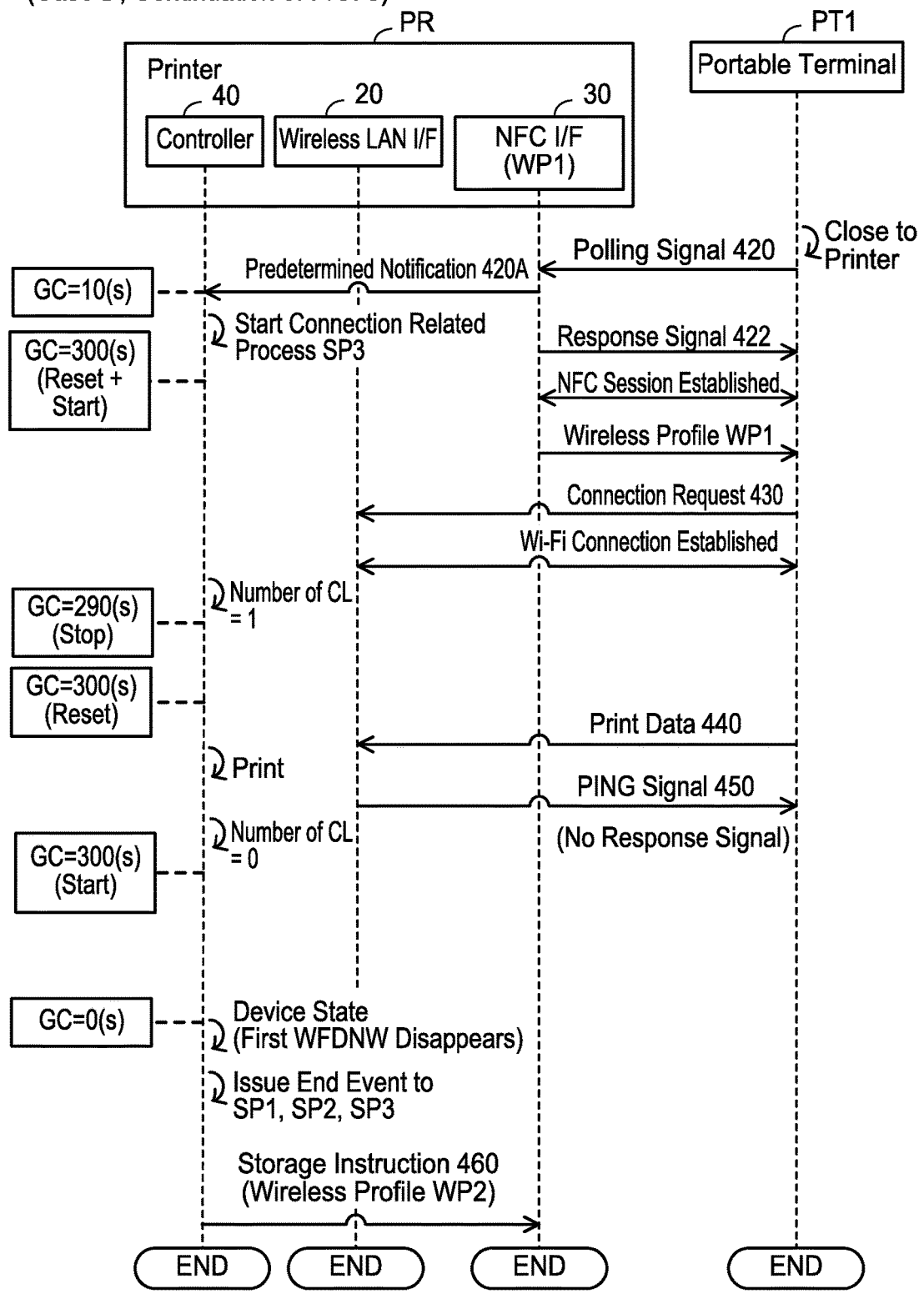

COMMUNICATION APPARATUS

CROSS-REFERENCE TO RELATED APPLICATIONS

This application claims priority to Japanese Patent Application No. 2014-184828, filed on Sep. 11, 2014, the contents of which are hereby incorporated by reference into the present application.

TECHNICAL FIELD

The present specification discloses a communication apparatus capable of operating as a parent station of a wireless network.

BACKGROUND ART

There is known a printer that forms a wireless network by shifting from a device state to a Group Owner state (hereinafter referred to as a "G/O state") in the WFD (an abbreviation for Wi-Fi Direct (Trademark)) scheme. When the number of apparatuses in a client state that are participating in the wireless network becomes zero, the printer determines a termination timing of a maintenance period for maintaining the G/O state. When the termination timing of the maintenance period arrives, the printer shifts from the G/O state to the device state and causes the wireless network to disappear. On the other hand, the printer, in the case of receiving a connection request from a target apparatus before the termination timing of the maintenance period arrives, establishes a wireless connection with the target apparatus by performing a connection process. Consequently, the target apparatus participates in the wireless network, and hence the printer can execute a wireless communication with the target apparatus by using the wireless network.

SUMMARY

The present specification provides a communication apparatus that may appropriately execute a wireless communication with an external apparatus.

A communication apparatus may comprise: a first interface configured to execute a wireless communication; a computer; and a memory that stores computer-readable instructions, wherein the computer-readable instructions, when executed by the computer, cause the communication apparatus to perform: in a case where an operation state of the communication apparatus is a parent state and a number of child apparatuses is zero, determining a termination timing of a maintenance period for maintaining the operation state of the communication apparatus in the parent state under a situation where the number of child apparatuses is zero, the parent state being for operating as a parent station of a first wireless network for executing a wireless communication via the first interface, the child apparatus being an apparatus which is participating in the first wireless network as a child station; when the termination timing of the maintenance period arrives, causing the first wireless network to disappear by changing the operation state of the communication apparatus from the parent state into a non-belonging state in which the communication apparatus is not belonging to a wireless network; in a case where a particular external apparatus participates in the first wireless network as the child station before the termination timing of the maintenance period arrives, executing a wireless communication of target data with the particular external apparatus via the first interface by using the first wireless network; detecting a predetermined instruction; and when the predetermined instruction is detected before the termination timing of the maintenance period arrives, extending the termination timing of the maintenance period so as to determine a new termination timing of the maintenance period.

A communication apparatus may comprise: a first interface configured to execute a wireless communication; a computer; and a memory that stores computer-readable instructions, wherein the computer-readable instructions, when executed by the computer, cause the communication apparatus to perform: in a case where an operation state of the communication apparatus is a second state which is different from a first state, determining a termination timing of a maintenance period for maintaining the operation state of the communication apparatus in the second state; when the termination timing of the maintenance period arrives, changing the operation state of the communication apparatus from the second state into the first state; in a case where a first wireless network to which both the communication apparatus and a particular external apparatus belong is formed before the termination timing of the maintenance period arrives, executing a wireless communication of target data with the particular external apparatus via the first interface by using the first wireless network; detecting a predetermined instruction; and when the predetermined instruction is detected before the termination timing of the maintenance period arrives, extending the termination timing of the maintenance period so as to determine a new termination timing of the maintenance period.

A control method and computer-readable instructions for implementation of the communication apparatus, and a non-transitory computer-readable medium in which the computer-readable instructions are stored, are also novel and useful. Further, a communication system comprising the above communication apparatus and an external apparatus is also novel and useful.

BRIEF DESCRIPTION OF DRAWINGS

FIG. 7 shows a sequence diagram in a Case B where a portable terminal participates in the WFD network;
FIG. 8 shows a sequence diagram in a Case C where a G/O maintenance period is extended;
and
FIG. 9 shows a sequence diagram in a Case D where a G/O maintenance period is extended.

EMBODIMENTS (Configuration of Communication System 2; FIG. 1)

As shown in FIG. 1, a communication system 2 comprises a printer PR and a plurality of portable terminals PT1, PT2. Each of the apparatuses PR, PT1, PT2 is capable of executing a wireless communication according to the Wi-Fi scheme (hereinafter referred to as the "Wi-Fi communication") and a wireless communication according to the NFC (an abbreviation for the Near Field Communication) scheme (hereinafter referred to as the "NFC communication").

(Configuration of Printer PR)

Figure 1:
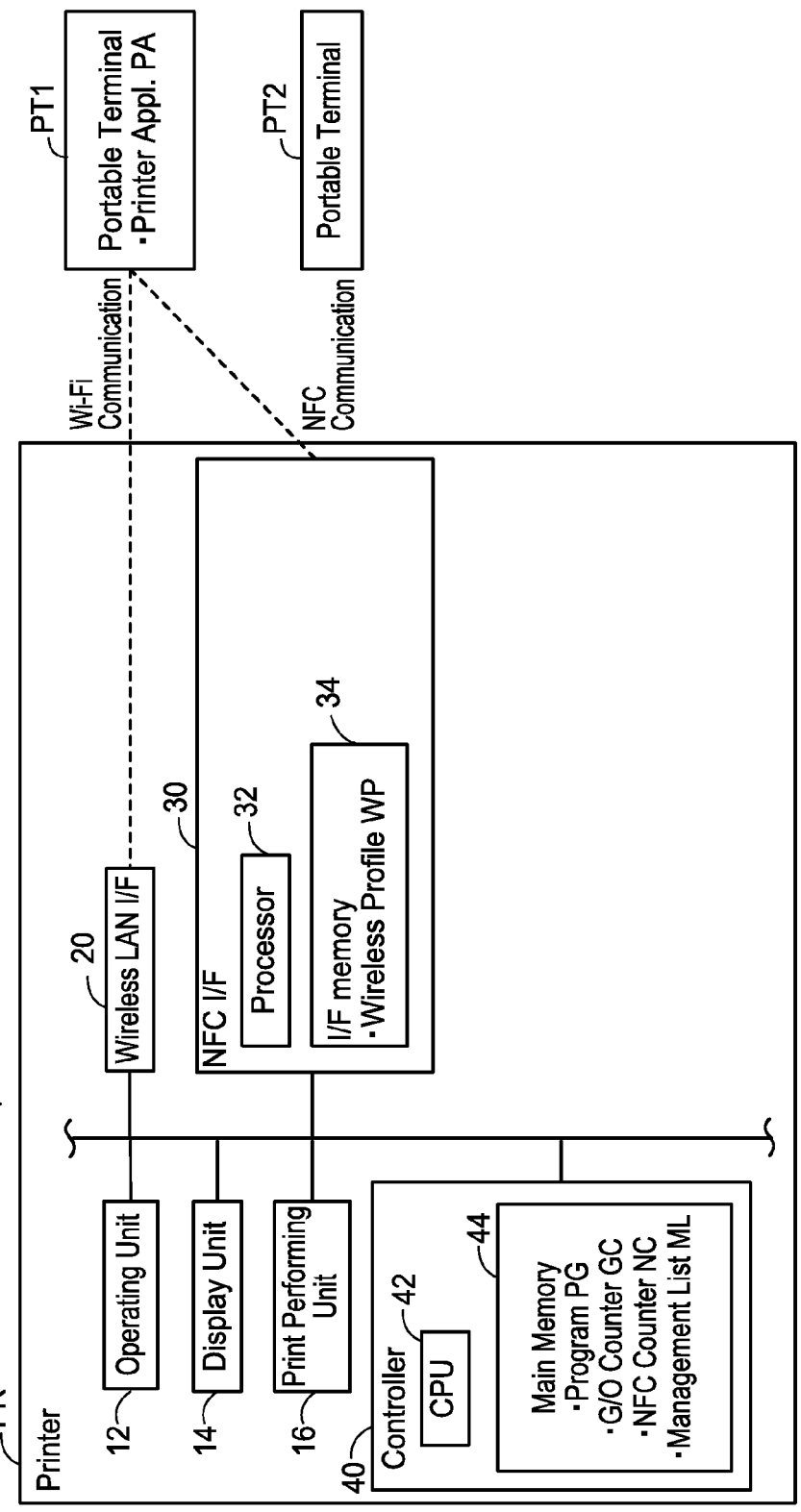
FIG. 1 shows a configuration of a communication system.

The Printer PR is a peripheral apparatus capable of performing a printing function (i.e., a peripheral apparatus for each of the portable terminals PT1, PT2). The printer PR comprises an operating unit 12, a display unit 14, a print performing unit 16, a wireless LAN (an abbreviation for a Local Area Network) interface 20, an NFC interface 30, and a controller 40. Each of the units 12 to 40 is connected to a bus line (the sign thereof is omitted). The interface is hereinafter described as an "I/F".

The operating unit 12 comprises a plurality of buttons. A user can give the printer PR various instructions by manipulating the operating unit 12. The display unit 14 is a display for displaying various information. The print performing unit 16 is a printing mechanism that adopts an ink-jet scheme, a laser scheme, etc.

The wireless LAN I/F 20 is a wireless I/F for executing a Wi-Fi communication according to the Wi-Fi scheme. The Wi-Fi scheme is a wireless communication scheme for executing a wireless communication according to, for example, the standards of IEEE (an abbreviation for the Institute of Electrical and Electronics Engineers, Inc.) 802.11 and the standards in conformity therewith (e.g., 802.11a, 11b, 11g, 11n, etc.). The wireless LAN I/F 20, in particular, supports the WFD (an abbreviation for the Wi-Fi Direct (Trademark)) scheme. The WFD scheme is a wireless communication scheme described in the specification "Wi-Fi Peer-to-Peer (P2P) Technical Specification Version 1.1" formulated by the Wi-Fi Alliance.

The NFC I/F 30 is a wireless I/F for executing an NFC communication according to the NFC scheme (i.e., a kind of so-called short-range wireless communications). The NFC scheme is a wireless communication scheme based on, for example, the International Organization for Standardization-standard ISO/IEC 21481 or 18092.

The NFC I/F 30 comprises a processor 32 and an I/F memory 34. The processor 32 is capable of communicating with the controller 40, and in accordance with a storage instruction obtained from the controller 40, writes in the I/F memory 34 (i.e., causes the I/F memory 34 to store) a wireless profile WP to be sent to a portable terminal (e.g., PT1). The processor 32, in the case of receiving a Polling signal from the portable terminal, sends thereto a response signal for the Polling signal so as to establish an NFC session with the portable terminal. The processor 32 reads from the I/F memory 34 the wireless profile WP prestored therein before the NFC session is established, and sends the wireless profile WP to the portable terminal by using the NFC session.

Note that, as a type of an I/F for executing the NFC communication, an I/F that is referred to as an NFC Forum Device and an I/F that is referred to as an NFC Forum Tag are known. The NFC I/F 30 is an NFC Forum Tag and functions as an IC tag in the NFC scheme.

The NFC Forum Device is an I/F capable of selectively operating in any of a P2P (an abbreviation for Peer To Peer) mode, a R/W (an abbreviation for Reader/Writer) mode, and a CE (an abbreviation for Card Emulation) mode. In the case where both the NFC I/F in a first apparatus and the NFC I/F in a second apparatus operate in the P2P mode, for example, the first and second apparatuses can execute a bidirectional data communication. In the case where the NFC I/F in the first apparatus operates in a Reader mode in the R/W mode, while the NFC I/F in the second apparatus operates in the CE mode, for example, the first apparatus can perform reading of data from the second apparatus, namely, receiving of data from the second apparatus. In the case where the NFC I/F in the first apparatus operates in a Writer mode in the R/W mode, while the NFC I/F in the second apparatus operates in the CE mode, for example, the first apparatus can perform writing of data in the second apparatus, namely, sending of data to the second apparatus.

The NFC Forum Tag (i.e., the NFC I/F 30 of the printer PR) is not the I/F capable of selectively operating in any of the three modes described above, but the I/F that functions only as an IC tag. In the case where an NFC I/F of the portable terminal operates in the Reader mode in the R/W mode, for example, the portable terminal can perform reading of a wireless profile WP from the NFC I/F 30 of the printer PR, namely, receiving of the wireless profile WP from the printer PR. Since the NFC Forum Tag (i.e., the NFC I/F 30 of the printer PR) is not the I/F capable of selectively operating in any of the three modes described above, it has a configuration simpler than that of the NFC Forum Device (i.e., a configuration of the IC chip is simple). Generally speaking, the IC chip functioning as an NFC Forum Tag is cheaper than the IC chip functioning as an NFC Forum Device.

For reference, a difference between the wireless LAN I/F 20 and the NFC I/F 30 will be described. The communication speed of the wireless communication via the wireless LAN I/F 20 (e.g., the maximum communication speed is 11 to 600 Mbps) is higher than that of the wireless communication via the NFC I/F 30 (e.g., the maximum communication speed is 100 to 424 Kbps). The frequency of carrier waves in the wireless communication via the wireless LAN I/F 20 (e.g., 2.4 GHz band or 5.0 GHz band) is different from that of carrier waves in the wireless communication via the NFC I/F 30 (e.g., 13.56 MHz band). The maximum distance for executing the wireless communication via the wireless LAN I/F 20 (e.g., approximately 100 m at the maximum) is greater than the maximum distance for executing the wireless communication via the NFC I/F 30 (e.g., approximately 10 cm at the maximum).

The controller 40 comprises a CPU 42 and a main memory 44. The CPU 42 is a processor that performs various processes in accordance with a program PG stored in the main memory 44. The main memory 44 is made of a RAM, a ROM, etc., and stores a G/O counter GC, an NFC counter NC, and a management list ML, in addition to the program PG described above.

The G/O counter GC is a counter for counting a time, and specifically, a counter for counting down from an initial value of 300 (seconds) to zero. The G/O counter GC is a counter for monitoring the arrival of a termination timing of a maintenance period for maintaining the operation state of the printer PR in a Group Owner state (hereinafter referred to as a "G/O state") in the WFD scheme. Note that the situation where the operation state of the printer PR is the G/O state may hereinafter be referred to as "the printer PR is G/O apparatus".

The NFC counter NC is a counter for counting a time, and specifically, a counter for counting down from an initial value of 5 (seconds) to zero. The NFC counter NC is a counter for determining whether to perform a connection related process in response to a predetermined notification obtained from the NFC I/F 30 (see FIG. 4) or not.

In the management list ML, CL information related to CL apparatus that belongs to a wireless network (hereinafter described as the "WFDNW") in which the printer PR is a G/O apparatus is described. The CL apparatus is an apparatus that operates in a CL state (i.e., a client state) in the WFD scheme. The CL information includes, for example, a MAC address of the CL apparatus.

(Configuration of Each of Portable Terminals PT1, PT2)

Each of the portable terminals PT1, PT2 is a portable-type terminal device such as a portable telephone (e.g., a smart phone), a PDA, a notebook PC, a tablet PC, a portable-type music replay device, a portable-type video replay device, etc. Each of the portable terminals PT1, PT2 comprises a wireless LAN I/F not shown in the drawing, and is capable of executing a Wi-Fi communication. In particular, the wireless LAN I/F of each of the portable terminals PT1, PT2 supports the WFD scheme. Each of the portable terminals PT1, PT2 comprises an NFC I/F not shown in the drawing, and is capable of executing an NFC communication. Note that the NFC I/F of each of the portable terminals PT1, PT2 is an NFC Forum Device, and operates in the Reader mode in the present embodiment.

The portable terminal PT1 comprises an application PA for causing the printer PR to perform printing (hereinafter referred to as a "printer appl. PA"). The printer appl. PA is an application for causing the portable terminal PT1 to participate, as CL apparatus, in the WFDNW in which the printer PR operates as G/O apparatus, and to send the print data to the printer PR by using the WFDNW. The printer appl. PA may, for example, be installed in the portable terminal PT1 from a server on the internet provided by a vendor of the printer PR, or may be installed in the portable terminal PT1 from the media shipped with the printer PR. The portable terminal PT2 does not comprise the printer appl. PA.

Figure 2:
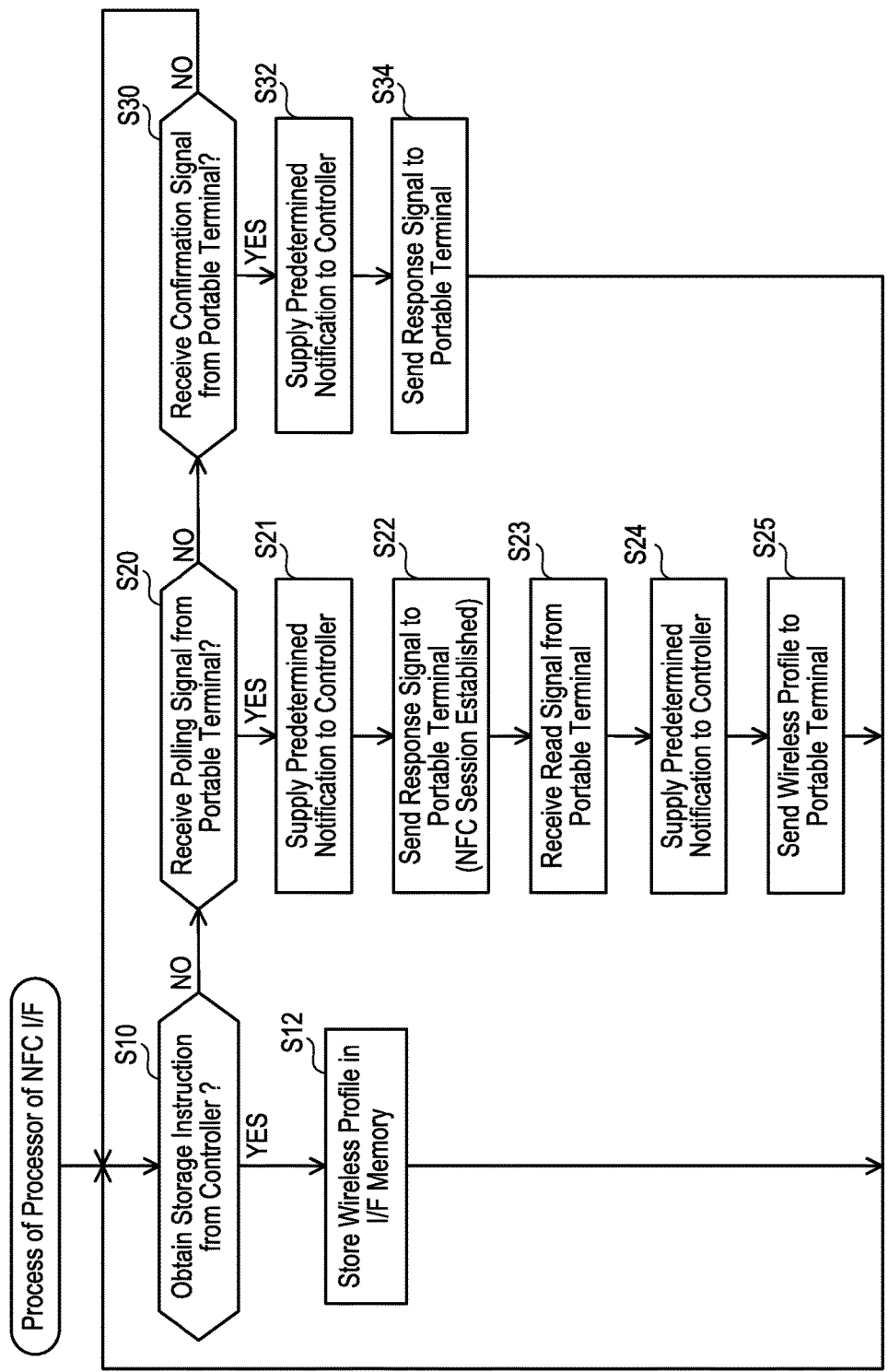
FIG. 2 shows a flowchart of a process of a processor in an NFC interface.

(Process of Processor 32; FIG. 2)

With reference to FIG. 2, a process performed by the processor 32 of the NFC I/F 30 will now be described. In the process in FIG. 2, monitoring steps S10, S20, and S30 are sequentially performed.

In S10, the processor 32 monitors obtaining of a storage instruction from the controller 40 (i.e., the CPU 42). The processor 32, in the case of obtaining the storage instruction from the controller 40, makes a YES determination in S10, and writes in the I/F memory 34 (i.e., causes the I/F memory 34 to store), in S12, a wireless profile included in the storage instruction obtained in S10. Note that, in a state in which an old wireless profile has already been stored in the I/F memory 34, the processor 32 writes in the I/F memory 34, in S12, a new wireless profile included in the storage instruction obtained in S10, in place of the old wireless profile. When S12 is completed, the processor 32 returns to S10.

In S20, the processor 32 monitors receiving of a Polling signal, which is a request signal for establishing an NFC session, from a portable terminal (e.g., the PT1). The processor 32, in the case of changing from a situation in which a distance between the NFC I/F 30 of the printer PR and the NFC I/F of the portable terminal (hereinafter referred to as a "device distance") is greater than a predetermined distance (e.g., 10 cm) into a situation in which the device distance is equal to or less than the predetermined distance, receives the Polling signal from the portable terminal, and then makes a YES determination in S20 so as to proceed to S21.

In S21, the processor 32 supplies to the controller 40 (i.e., the CPU 42) a predetermined notification in response to the receiving of the Polling signal. The predetermined notification is a notification indicating that a signal is received from the portable terminal. In S22, the processor 32 sends to the portable terminal a response signal for the Polling signal. The NFC session is thereby established between the NFC I/F 30 of the printer PR and the NFC I/F of the portable terminal.

Then in S23, the processor 32 receives a Read signal from the portable terminal by using the NFC session established in S22. The Read signal is a signal provided by the portable terminal that operates in the Reader mode in the NFC Forum Device for requesting the printer PR to read data. In S24, the processor 32 supplies to the controller 40 the predetermined notification in response to the receiving of the Read signal. The predetermined notification supplied in S24 is the same as that supplied in S21. In S25, the processor 32 reads the wireless profile WP from the I/F memory 34, and sends it to the portable terminal by using the NFC session established in S22. When S25 is completed, the processor 32 returns to S10.

In S30, the processor 32 monitors receiving of a confirmation signal from the portable terminal. The confirmation signal is a signal for confirming whether the NFC session is in an established state or not. The processor 32, in the case of receiving the confirmation signal from the portable terminal, makes a YES determination in S30, and supplies to the controller 40, in S32, the predetermined notification in response to the receiving of the confirmation signal. The predetermined notification supplied in S32 is the same as those supplied in S21 and S24. In S34, the processor 32 sends to the portable terminal a response signal for the confirmation signal. When S34 is completed, the processor 32 returns to S10.

The portable terminal, after establishing the NFC session with the printer PR, sends the confirmation signal to the printer PR a plurality of times, as long as a situation in which the device distance described above is equal to or less than the predetermined distance is maintained. Since the processor 32 of the printer PR thus may receive the confirmation signal a plurality of times within a short time (YES in S30), the processor 32 may therefore supply the predetermined notification to the controller 40 a plurality of times within a short time (S32). Supposing that there is adopted a configuration in which the controller 40, whenever obtaining the predetermined notification from the processor 32, performs a process in response to the predetermined notification, a processing load of the printer PR would be increased. To avoid this, the NFC counter NC is provided in the present embodiment, so that if the predetermined notification is obtained while the NFC counter NC is making a count, a process in response to the notification is not performed. Consequently, the processing load of the printer PR can be reduced.

Figure 3:
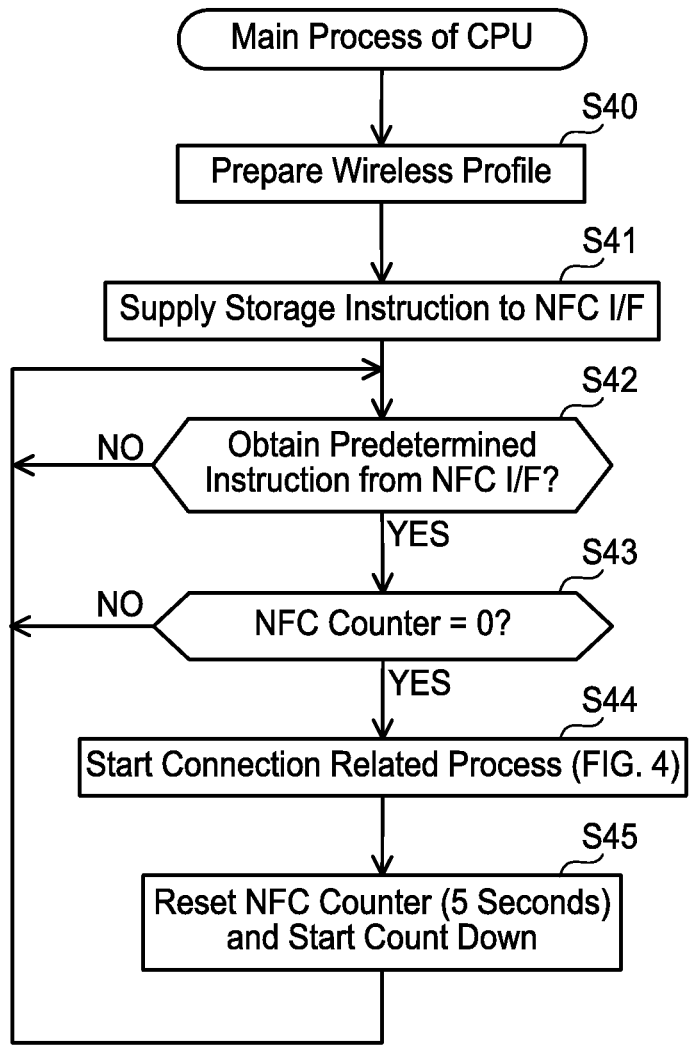
FIG. 3 shows a flowchart of a main process of a CPU.

(Main Process of CPU 42; FIG. 3)

With reference to FIG. 3, a main process performed by the CPU 42 of the controller 40 will now be described. When a power supply of the printer PR is switched from an OFF state to an ON state, the CPU 42 performs the main process.

In S40, the CPU 42 prepares the wireless profile WP. The printer PR, in a process of S52 in FIG. 4 described below, forms a WFDNW by operating in the G/O state in the WED scheme. The wireless profile WP prepared in S40 is information to be used in the WFDNW. Namely, the wireless profile WP prepared in S40 is information to be used in the WFDNW that may be formed in the future by the printer PR. When the portable terminal receives the wireless profile WP from the printer PR, for example, the portable terminal can therefore participate in the WFDNW described above. Consequently, the portable terminal can send print data to the printer PR, for example, by using the above-described WFDNW. The wireless profile WP prepared in S40 includes an SSID (an abbreviation for a Service Set Identifier), an authentication scheme, an encryption scheme, a password, etc. The CPU 42 prepares the SSID and the password by randomly selecting a character string. The CPU 42 also prepares the predetermined authentication scheme and the predetermined encryption scheme. Having prepared the wireless profile WP, the CPU 42 causes the main memory 44 to store it.

In S41, the CPU 42 supplies to the NFC I/F 30 the storage instruction that includes the wireless profile WP prepared in S40. The processor 32 of the NFC I/F 30 thereby writes in the I/F memory 34 the wireless profile WP included in the storage instruction (see S12 in FIG. 2).

In S42, the CPU 42 monitors obtaining of the predetermined notification (see S21, S24, and S32 in FIG. 2) from the NFC I/F 30 (i.e., the processor 32). The CPU 42, in the case of obtaining the predetermined notification from the NFC I/F 30, makes a YES determination in S42, and proceeds to S43.

In S43, the CPU 42 determines whether the value of the NFC counter NC in the main memory 44 is zero or not. The CPU 42, in the case of determining that the value of the NFC counter NC is zero (YES in S43), proceeds to S44, and in the case of determining that the value of the NFC counter NC is not zero (NO in S43), skips S44 and S45 and returns to S42. Namely, if the CPU 42 obtains the predetermined notification from the NFC I/F 30 under the situation where the value of the NFC counter NC is not zero, the CPU 42 does not perform a process in response to the predetermined notification (i.e., S44). Therefore, even if a plurality of predetermined notifications are obtained within a short time, a plurality of connection related processes are not started in S44. Consequently, the processing load of the printer PR can be reduced.

In S44, the CPU 42 starts a connection related process (see FIG. 4 described below). Note that the CPU 42, when performing S44 while a first connection related process is performed, newly starts a second connection related process as a process separate from the first connection related process. Namely, the CPU 42 can perform a plurality of connection related processes in parallel.

In S45, the CPU 42 resets the value of the NFC counter NC in the main memory 44 into an initial value of 5 (seconds), and starts a count down of the NFC counter NC. When S45 is completed, the CPU 42 returns to S42.

(Connection Related Process of CPU 42; FIG. 4)

Figure 4:
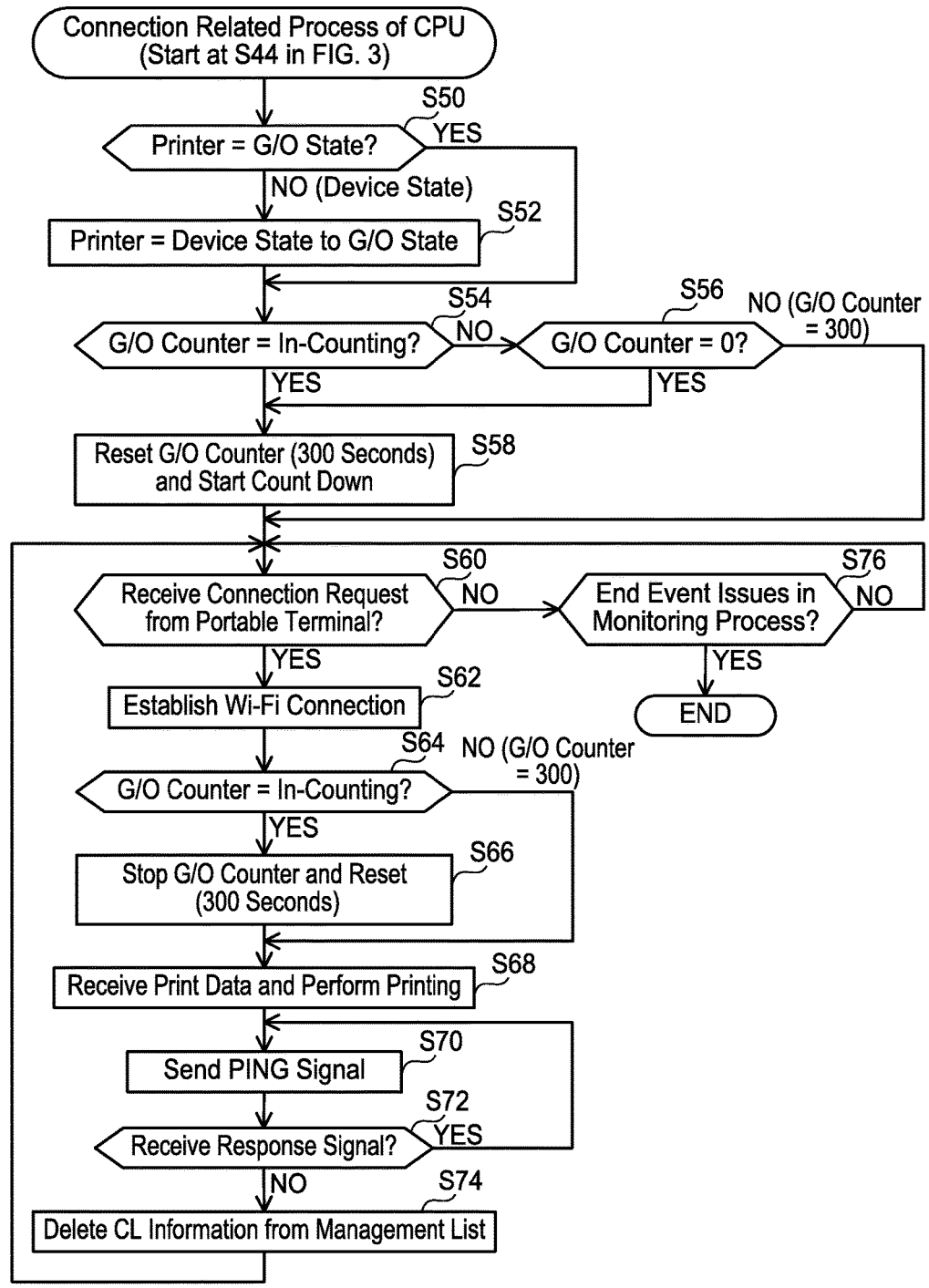
FIG. 4 shows a flowchart of a connection related process of the CPU.

With reference to FIG. 4, the connection related process started in S44 in FIG. 3 will now be described. In S50, the CPU 42 determines whether the operation state of the printer PR is a G/O state or not. The CPU 42, in the case of determining that the operation state of the printer PR is the G/O state (YES in S50), skips S52 and proceeds to S54, and in the case of determining that the operation state of the printer PR is a device state (NO in S50), proceeds to S52. The device state herein is a state in which the printer PR operates neither in the G/O state nor in the CL state in the WFD scheme, and in which the printer PR does not belong to any wireless network. Note that, although not shown in the drawing, the CPU 42, in the case of determining that the operation state of the printer PR is a CL state in S50, performs none of the processes in S52 to S76 in FIG. 4, and completes the connection related process in FIG. 4.

In S52, the CPU 42 changes the operation state of the printer PR from the device state into the G/O state so as to form a WFDNW in which the printer PR is a G/O apparatus. The WFDNW is a wireless network in which the wireless profile WP currently stored in the main memory 44 (see S40 in FIG. 3) is to be used. At the time point when the WFDNW is formed in S52, only the printer PR, which is the G/O apparatus, belongs thereto, and not a single CL apparatus belongs thereto. Not a single piece of CL information, therefore, is described in the management list ML in the main memory 44. When S52 is completed, the CPU 42 proceeds to S54.

In S54, the CPU 42 determines whether the G/O counter GC in the main memory 44 is making a count. More specifically, in the case where the value of the G/O counter GC is any of 1 to 299 (seconds), the CPU 42 determines that the G/O counter GC is making a count (YES in S54), resets the value of the G/O counter GC from a current value (e.g., 200 (seconds)) into an initial value of 300 (seconds), and starts a count down of the G/O counter GC in S58. When S58 is completed, the CPU 42 sequentially performs the monitoring steps S60 and S76.

In the case where the G/O counter GC stops at zero or 300 (seconds), the CPU 42 determines that the G/O counter GC is not making a count (NO in S54), and proceeds to S56. In S56, the CPU 42 determines whether the G/O counter GC stops at zero or stops at 300 (seconds). The CPU 42, in the case of determining that the G/O counter GC stops at zero (YES in S56), resets the G/O counter GC from zero into the initial value of 300 (seconds) and starts a count down of the G/O counter GC in S58. The CPU 42, in the case of determining that the G/O counter GC stops at 300 (seconds) (NO in S56), skips S58, and sequentially performs the monitoring steps S60 and S76.

In S60, the CPU 42 monitors receiving of a particular connection request from the portable terminal via the wireless LAN I/F 20. The particular connection request is a Probe Request, and includes the SSID in the wireless profile WP currently stored in the main memory 44. The particular connection request is a request received under the situation where the printer PR is the G/O apparatus, namely, under the situation where the WFDNW is formed. The CPU 42, in the case of receiving the particular connection request from the portable terminal, makes a YES determination in S60, and proceeds to S62. Note that, under the situation where a plurality of connection related processes are performed in parallel, the CPU 42, in the case of receiving the particular connection request from the portable terminal, makes a YES determination in S60 in one of the plurality of connection related processes, and proceeds to S62. Namely, in other connection related processes in the plurality of connection related processes, the CPU 42 does not make a YES determination in S60, and maintains a state in which the monitoring steps in S60 and S76 are sequentially performed.

In S62, the CPU 42 establishes a Wi-Fi connection with the portable terminal that is a transmission source of the particular connection request (hereinafter referred to as a "target portable terminal"). Specifically, the CPU 42 sends a response signal for the particular connection request (i.e., a Probe Response) to the target portable terminal via the wireless LAN I/F 20. In addition, the CPU 42 executes via the wireless LAN I/F 20 a communication such as a Provision Discovery Request/Response, an Association Request/Response, an Authentication Request/Response, a 4-Way Handshake, etc. In this process stage, each information included in the wireless profile WP (e.g., the authentication scheme, the encryption scheme, the password, etc.) is sent from the target portable terminal to the printer PR, and the CPU 42 performs an authentication of the target portable terminal by using each information described above. In the case where the authentication of the target portable terminal is successfully performed, the CPU 42 establishes via the wireless LAN I/F 20 the Wi-Fi connection with the target portable terminal. The CPU 42 can thereby cause the target portable terminal to participate, as CL apparatus, in the WFDNW in which the printer PR is the G/O apparatus. The CPU 42, in the case of establishing the Wi-Fi connection with the target portable terminal, describes CL information that includes a MAC address of the target portable terminal, in the management list ML in the main memory 44.

In S64, the CPU 42 determines whether the G/O counter GC in the main memory 44 is making a count or not. More specifically, in the case where the value of the G/O counter GC is any of 1 to 299 (seconds), the CPU 42 determines that the G/O counter GC is making a count (YES in S64), stops the count of the G/O counter GC and resets the value of the G/O counter GC from the current value (e.g., 200 (seconds)) into the initial value of 300 (seconds) in S66. At this time, however, the CPU 42 does not start the count of the G/O counter GC. The G/O counter GC is therefore in a state of stopping at 300 (seconds), and consequently, a NO determination may be made in S56 in other connection related processes. As described above, since the G/O counter GC stops at 300 (seconds) in S66, the G/O counter GC is prevented from becoming zero under the situation where the target portable terminal is participating in the WFDNW. Namely, as described in the monitoring process in FIG. 5 described below, the printer PR can prevent its shift from the G/O state to the device state while the target portable terminal is participating in the WFDNW. When S66 is completed, the CPU 42 proceeds to S68.

In the case where the G/O counter GC stops at 300 (seconds), the CPU 42 determines that the G/O counter GC is not making a count (NO in S64), skips S66 and proceeds to S68. Note that, in the stage in S64, there cannot be a situation where the G/O counter GC stops at zero. This is because when the G/O counter GC becomes zero, an end event is issued (see S86 in FIG. 5), resulting in that the connection related process is completed (YES in S76 in FIG. 4).

In S68, the CPU 42 performs a printing process. Specifically, the CPU 42, by using the WFDNW in which the printer PR is the G/O apparatus, initially receives the print data that represents an image of a target to be printed, via the wireless LAN I/F 20 from the target portable terminal, which is the CL apparatus. The CPU 42 then supplies the print data to the print performing unit 16 so as to cause the print performing unit 16 to perform printing of the image.

Since the print data is an image file etc., the data size thereof is relatively large. Moreover, the communication speed of the NFC communication is lower than that of the Wi-Fi communication. The result is that, supposing that there is adopted a configuration where the wireless communication of the print data is executed between the printer PR and the target portable terminal in accordance with the NFC communication, it would take a long time for the printer PR to receive the print data. In contrast, in the present embodiment, the wireless communication of the print data is executed between the printer PR and the target portable terminal in accordance with the Wi-Fi communication, so that the printer PR can quickly receive the print data.

In S70, the CPU 42 sends a PING signal to the target portable terminal via the wireless LAN I/F 20. The PING signal is a signal for confirming whether the Wi-Fi connection with the target portable terminal is established or not. In S72, the CPU 42 monitors receiving of a response signal for the PING signal from the target portable terminal via the wireless LAN I/F 20. The CPU 42, in the case of receiving the response signal from the target portable terminal, makes a YES determination in S72 and returns to S70. The CPU 42, in the case of not receiving the response signal from the target portable terminal before a predetermined time elapses from the timing of sending the PING signal in S70, makes a NO determination in S72 and proceeds to S74.

In S74, the CPU 42 deletes the CL information that includes a MAC address of the target portable terminal, namely, the CL information described in S62, from the management list ML in the main memory 44. The target portable terminal thereby leaves the WFDNW. When S74 is completed, the CPU 42 returns to S60. Therefore, supposing that the CPU 42 receives the particular connection request from the target portable terminal again (YES in S60), the CPU 42 can establish the Wi-Fi connection with the target portable terminal again (S62).

On the other hand, in S76, the CPU 42 monitors an end event (see S86) being issued in the monitoring process in FIG. 5 described below. In the case where the end event is issued, the CPU 42 makes a YES determination in S76, and completes the process in FIG. 4.

(Monitoring Process of CPU 42; FIG. 5)

Figure 5:
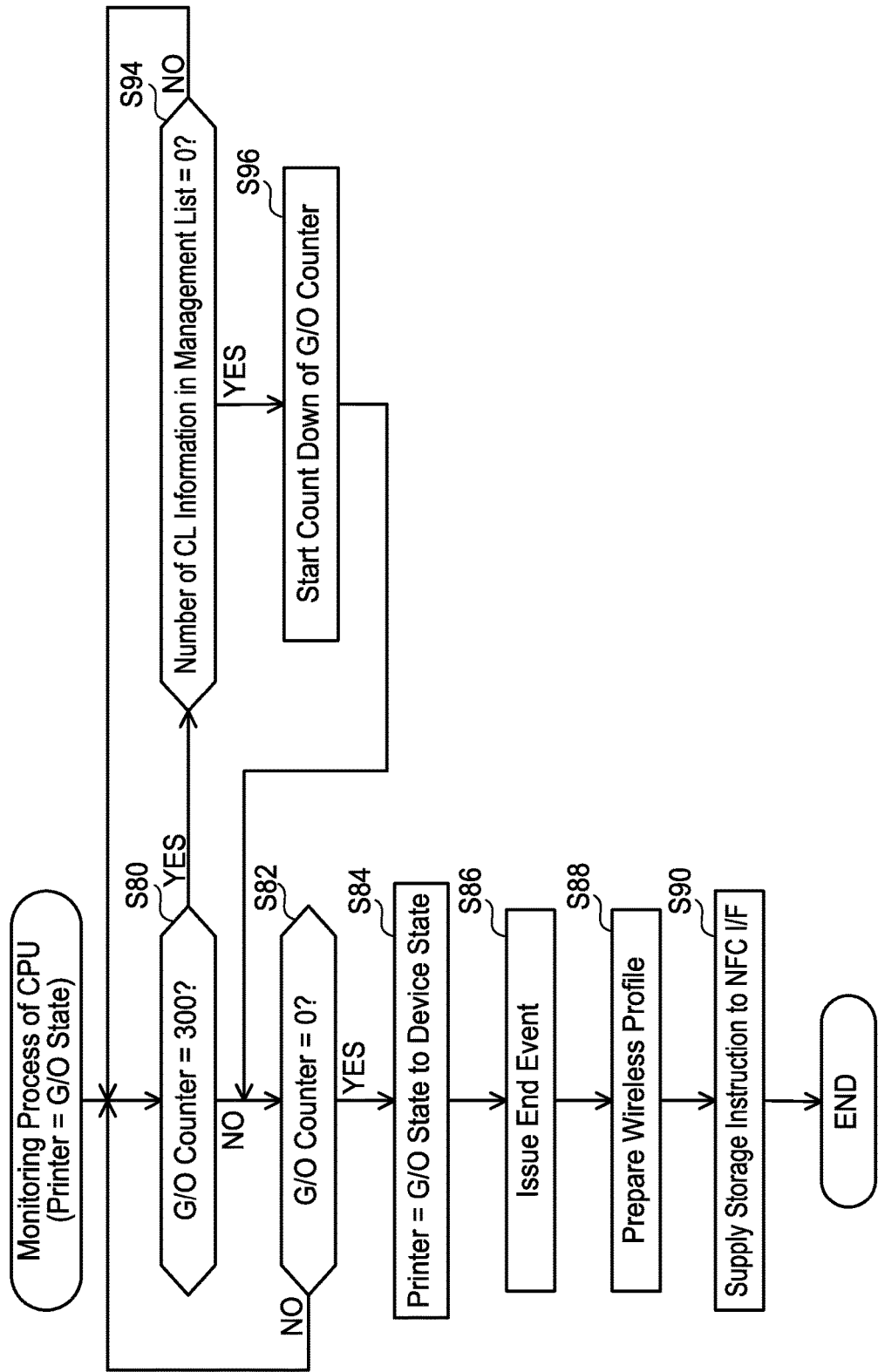
FIG. 5 shows a flowchart of a monitoring process of the CPU.

With reference to FIG. 5, the monitoring process performed by the CPU 42 of the controller 40 will now be described. When the operation state of the printer PR is switched from the device state to the G/O state (see S52 in FIG. 4), the CPU 42 performs the monitoring process.

In S80, the CPU 42 determines whether the G/O counter GC in the main memory 44 stops at 300 (seconds) or not. The CPU 42, in the case of determining that the G/O counter GC stops at 300 (seconds) (YES in S80), proceeds to S94. On the other hand, the CPU 42, in the case of determining that the G/O counter GC does not stop at 300 (seconds), namely, determining that the value of the G/O counter GC is any of 0 to 299 (NO in S80), proceeds to S82.

In S82, the CPU 42 determines whether the G/O counter GC stops at zero (second) or not. The CPU 42, in the case of determining that the G/O counter GC does not stop at zero, namely, determining that the value of the G/O counter GC is any of 1 to 299 (NO in S82), returns to S80. On the other hand, the CPU 42, in the case of determining that the G/O counter GC stops at zero (YES in S82), proceeds to S84.

In S84, the CPU 42 shifts the operation state of the printer PR from the G/O state to the device state so as to cause the WFDNW in which the printer PR is the G/O apparatus to disappear.

In S86, the CPU 42 issues the end event. Consequently, in every S76 (see FIG. 4) in one or more connection related processes that are currently performed, a YES determination is made, and the one or more connection related processes are completed.

The CPU 42 then prepares a new wireless profile WP in S88, and supplies to the NFC I/F 30, in S90, a storage instruction that includes the wireless profile WP prepared in S88. The S88 and S90 are similar to S40 and S41 in FIG. 3. As described above, the CPU 42 prepares, in S40, the SSID and the password by randomly selecting a character string. This feature is similar to that in S88. The SSID and the password prepared in S88, therefore, are usually different from those prepared in S40. Moreover, the SSID and the password prepared in S88 at this time are usually different from those prepared in S88 at the previous time. In this way, the CPU 42 can prepare the unique wireless profile WP that has not yet been used. When S90 is completed, the process in FIG. 5 is completed.

On the other hand, in S94, the CPU 42 determines whether the number of CL information described in the management list ML in the main memory 44 is zero or not. Namely, the CPU 42 determines whether the number of CL apparatuses participating in the WFDNW in which the printer PR is the G/O apparatus is zero or not. The CPU 42, in the case of determining that the number of CL information is not zero (NO in S94), returns to S80, and in the case of determining that the number of CL information is zero (YES in S94), proceeds to S96.

In S96, the CPU 42 starts a count down of the G/O counter GC. Since the G/O counter GC stops at 300 (seconds) (YES in S80), the CPU 42 starts the count down from the initial value of 300 (seconds). When S96 is completed, the CPU 42 proceeds to S82.

Figure 6:
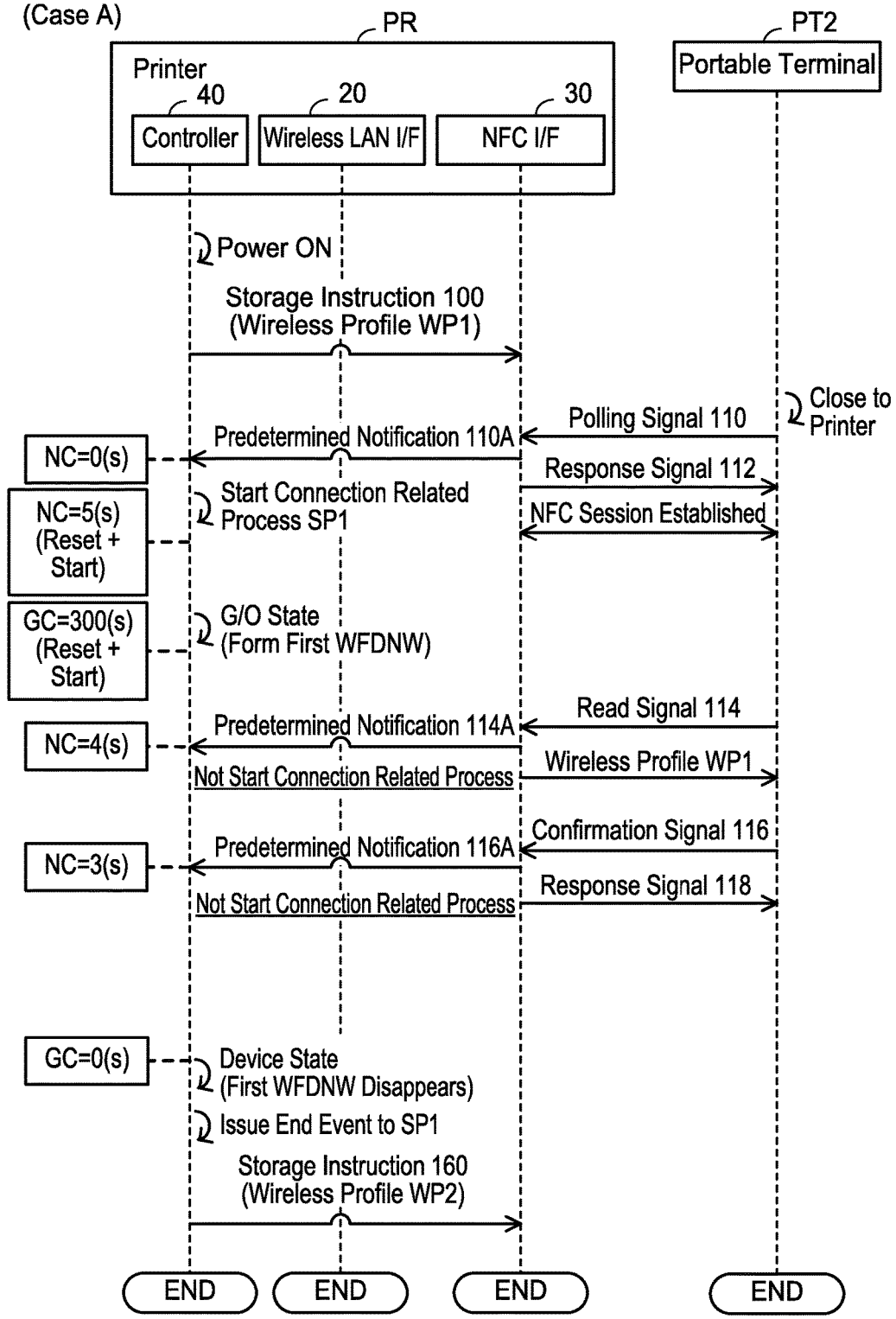
FIG. 6 shows a sequence diagram in a Case A where a WFD network disappears with no portable terminal participating therein.

(Case A; FIG. 6)

With reference to FIGS. 6 to 9, specific Cases A to D implemented by the flowcharts in FIGS. 2 to 5 will now be described.

When the power supply of the printer PR is switched from an OFF state to an ON state, the controller 40 prepares a wireless profile WP1 (S40 in FIG. 3), and supplies to the NFC I/F 30 a storage instruction 100 that includes the wireless profile WP1 (S41). Consequently, the wireless profile WP1 is written in the I/F memory 34 (S12 in FIG. 2).

A user of the portable terminal PT2 brings the portable terminal PT2 close to the printer PR. The situation in which the device distance between the NFC I/F 30 of the printer PR and the NFC I/F of the portable terminal PT2 is greater than the predetermined distance (e.g., 10 cm) thereby changes into the situation in which the device distance is equal to or less than the predetermined distance. Consequently, the NFC I/F 30 of the printer PR receives a Polling signal 110 from the portable terminal PT2 (YES in S20 in FIG. 2), and supplies a predetermined notification 110A to the controller 40 (S21). Since the value of the NFC counter NC is zero at this time point, the controller 40 starts a connection related process SP1 in response to the predetermined notification 110A (YES in S42, YES in S43, and S44 in FIG. 3), resets the value of the NFC counter NC from zero into 5 (seconds), and starts a count down of the NFC counter NC (S45). In the connection related process SP1, the controller 40 causes the operation state of the printer PR to shift from the device state to the G/O state (S52 in FIG. 4) so as to form a first WFDNW in which the wireless profile WP1 is to be used. In addition, the controller 40 resets the value of the G/O counter GC from zero into 300 (seconds), and starts a count down of the G/O counter GC (NO in S54, YES in S56, and S58).

At the time point when the first WFDNW is formed, the number of CL apparatuses participating in the first WFDNW is zero. As described above, the controller 40, when obtaining the predetermined notification 110A, starts a count down of the G/O counter GC from 300 (seconds). The controller 40, when obtaining the predetermined notification 110A, can thereby determine a termination timing of the G/O maintenance period for maintaining the operation state of the printer PR in the G/O state under the situation where the number of CL apparatuses is zero (namely, the termination timing is the time point 300 (seconds) after the obtaining of the predetermined notification 110A).

The NFC I/F 30 of the printer PR sends to the portable terminal PT2 a response signal 112 for the Polling signal 110 (S22 in FIG. 2). Consequently, an NFC session is established between the NFC I/F 30 of the printer PR and the NFC I/F of the portable terminal PT2. The NFC I/F 30 then receives a Read signal 114 from the portable terminal PT2 by using the NFC session (S23), and supplies a predetermined notification 114A to the controller 40 (S24). At this time point, however, since the value of the NFC counter NC is 4 (seconds), the controller 40 does not newly start a connection related process in response to the predetermined notification 114A (YES in S42, NO in S43 in FIG. 3). The NFC I/F 30 then sends the wireless profile WP1 to the portable terminal PT2 in response to the Read signal 114 by using the NFC session (S25). In this way, in the present embodiment, the printer PR can send to the portable terminal PT2 the wireless profile WP1 prestored in the NFC I/F 30 before the first WFDNW is formed.

The NFC I/F 30 receives a confirmation signal 116 from the portable terminal PT2 by using the NFC session (YES in S30 in FIG. 2), and supplies a predetermined notification 116A to the controller 40 (S32). At this time point, however, since the value of the NFC counter NC is 3 (seconds), the controller 40 does not newly start a connection related process in response to the predetermined notification 116A (YES in S42, NO in S43 in FIG. 3). The NFC I/F 30 sends to the portable terminal PT2 a response signal 118 for the confirmation signal 116 (S34).

As described above, the controller 40 starts the connection related process SP1 in response to the predetermined notification 110A, whereas it does not start a connection related process if it obtains the predetermined notification 114A and the predetermined notification 116A again before 5 (seconds) elapse from the timing of obtaining the predetermined notification 110A. In other words, the controller 40 detects an instruction of a start trigger of the connection related process SP1 in response to the predetermined notification 110A (YES in S43 in FIG. 3), whereas it does not detect the instruction in response to the predetermined notification 114A and the predetermined notification 116A (NO in S43 in FIG. 3). Since a connection related process is not performed in response to the predetermined notification 114A and the predetermined notification 116A, the processing load of the printer PR can be reduced.

Since the portable terminal PT2 does not comprise the printer appl. PA, even if it receives the wireless profile WP1 from the printer PR, it cannot send a connection request to the printer PR, and cannot participate, as CL apparatus, in the first WFDNW. Consequently, the count down of the G/O counter GC proceeds while the situation where the number of CL apparatuses for the first WFDNW is zero is maintained, resulting in that the value of the G/O counter GC becomes zero. Namely, the termination timing of the G/O maintenance period arrives. In this case, the controller 40 causes the operation state of the printer PR to shift from the G/O state to the device state so as to cause the first WFDNW to disappear (YES in S82, and S84 in FIG. 5). The controller 40 then causes an end event to be issued (S86), and completes the connection related process SP1 (YES in S76 in FIG. 4).

The controller 40 then prepares a wireless profile WP2 different from the wireless profile WP1 (S88 in FIG. 5), and supplies to the NFC I/F 30 a storage instruction 160 that includes the wireless profile WP2 (S90). Consequently, the wireless profile WP2 is written in the I/F memory 34 (S12 in FIG. 2). The wireless profile WP2 is a wireless profile to be used in a second WFDNW that is to be formed in the future. Supposing that the printer PR receives a Polling signal from a portable terminal (e.g., the WP1), it can send to the portable terminal the wireless profile WP2 prestored in the NFC I/F 30 before the second WFDNW is formed.

As described above, in the present embodiment, when the termination timing of the G/O maintenance period arrives, the printer PR shifts from the G/O state to the device state and causes the first WFDNW to disappear. The reason thereof is as follows: the printer PR in the G/O state regularly sends via the wireless LAN I/F 20 a beacon signal for searching for an apparatus that exists in the periphery of the printer PR. The power consumption of the printer PR in the G/O state, therefore, is usually larger than that of the printer PR in the device state, which does not send the beacon signal. In the present embodiment, when the termination timing of the G/O maintenance period arrives, the printer PR shifts from the G/O state to the device state, so that the power consumption of the printer PR can be reduced appropriately.

(Case B; FIG. 7)

With reference to FIG. 7, a Case B will now be described. In an initial state of the Case B, the wireless profile WP1 has already been stored in the NFC I/F 30 (e.g., S41 in FIG. 3, S12 in FIG. 2). In the Case B, the Read signal and the confirmation signal are not shown in the drawing, and the descriptions thereof are omitted. The descriptions of the Read signal and the confirmation signal are also omitted in a Case C and a Case D in FIGS. 8 and 9 described below.

A user of the portable terminal PT1 brings the portable terminal PT1 close to the printer PR. The NFC I/F 30 of the printer PR thereby receives a Polling signal 210 from the portable terminal PT1 (YES in S20 in FIG. 2), and supplies a predetermined notification 210A to the controller 40 (S21). The controller 40 starts a connection related process SP2 in response to the predetermined notification 210A (YES in S42, YES in S43, and S44 in FIG. 3), and in the connection related process SP2, and cause the operation state of the printer PR to shift from the device state to the G/O state (S52 in FIG. 4) so as to form a first WFDNW in which the wireless profile WP1 is to be used. In addition, the controller 40 determines the termination timing of the G/O maintenance period (i.e., the time point 300 (seconds) after the obtaining of the predetermined notification 210A) by starting a count down of the G/O counter GC from 300 (seconds) (NO in S54, YES in S56, and S58).

The NFC I/F 30 of the printer PR sends to the portable terminal PT1 a response signal 212 for the Polling signal 210 (S22 in FIG. 2). Consequently, an NFC session is established between the NFC I/F 30 of the printer PR and the NFC I/F of the portable terminal PT1. The NFC I/F 30 then sends the wireless profile WP1 to the portable terminal PT1 by using the NFC session (S25).

Since the portable terminal PT1 comprises the printer appl. PA, the portable terminal PT1, in the case of receiving the wireless profile WP1 from the printer PR, can send to the printer PR a connection request 230 that includes the SSID in the wireless profile WP1. Consequently, the controller 40 of the printer PR receives the connection request 230 from the portable terminal PT1 via the wireless LAN I/F 20 (YES in S60 in FIG. 4). The controller 40 establishes a Wi-Fi connection with the portable terminal PT1 so as to cause the portable terminal PT1 to participate, as CL apparatus, in the first WFDNW (S62). Namely, the CL information that includes a MAC address of the portable terminal PT1 is written in the management list ML (see FIG. 1), and the number of CL apparatuses participating in the first WFDNW becomes "1" (which is expressed as "Number of CL=1" in FIG. 7). At this time point, since the number of the G/O counter GC is 290 (seconds) (YES in S64), the controller 40 stops the count of the G/O counter GC, and resets the value of the G/O counter from 290 (seconds) into 300 (seconds) (S66). In this way, in the present embodiment, the printer PR stops the count of the G/O counter GC in the case where the portable terminal PT1 participates, as CL apparatus, in the first WFDNW before the termination timing of the G/O maintenance period arrives. The printer PR therefore does not cause the first WFDNW to disappear under the situation where the portable terminal PT1 is participating in the first WFDNW, so that the printer PR can appropriately execute the wireless communication with the portable terminal PT1 by using the first WFDNW.

The controller 40 of the printer PR then receives print data 240 from the portable terminal PT1 via the wireless LAN I/F 20 by using the first WFDNW, and performs a printing process (S68 in FIG. 4). The controller 40 then sends a PING signal 250 to the portable terminal PT1 via the wireless LAN I/F 20. For example, after the completion of the printing at the printer PR, a user of the portable terminal PT1 brings the portable terminal PT1 to a location considerably apart from the printer PR. Consequently, the controller 40 does not receive from the portable terminal PT1 a response signal for the PING signal 250 (NO in S72), and deletes from the management list ML the CL information that includes the MAC address of the portable terminal PT1 (S74). The portable terminal PT1 thereby leaves the first WFDNW, resulting in that the number of CL apparatuses participating in the first WFDNW becomes zero (which is expressed as "Number of CL=0" in FIG. 7). In this case, the controller 40 starts a count down of the G/O counter GC from 300 (seconds) (YES in S94, and S96 in FIG. 5).

As described above, when the portable terminal PT1 leaves the first WFDNW, the number of CL apparatuses participating in the first WFDNW becomes zero. When the number of the CL apparatuses becomes zero, the controller 40 starts the count down of the G/O counter GC from 300 (seconds). Thereby when the number of CL apparatuses becomes zero, the controller 40 can determine the termination timing of the G/O maintenance period (i.e., the time point 300 (seconds) after the timing when the number of CL apparatuses becomes zero).

The count down of the G/O counter GC then proceeds while there is maintained a situation where the number of CL apparatuses is zero, resulting in that the value of the G/O counter GC becomes zero. In this case, the controller 40 causes the operation state of the printer PR to shift from the G/O state to the device state so as to cause the first WFDNW to disappear (YES in S82, and S84 in FIG. 5). The controller 40 then issues an end event (S86), and completes the connection related process SP2 (YES in S76 in FIG. 4). The controller 40 prepares a wireless profile WP2 different from the wireless profile WP1 (S88 in FIG. 5), and supplies a storage instruction 260 that includes the wireless profile WP2 to the NFC I/F 30 (S90). Consequently, the wireless profile WP2 is written in the I/F memory 34 (S12 in FIG. 2).

As described above, in the present embodiment, in the case where the portable terminal PT1 participates, as CL apparatus, in the first WFDNW before the termination timing of the G/O maintenance period arrives, the printer PR can receive the print data 240 from the portable terminal PT1, and appropriately perform the printing process. When the termination timing of the G/O maintenance period arrives after the portable terminal PT1 leaves the first WFDNW, the printer PR shifts from the G/O state to the device state so as to cause the first WFDNW to disappear. The power consumption of the printer PR can therefore be reduced appropriately.

(Case C; FIG. 8)

With reference to FIG. 8, a Case C will now be described. In an initial state of the Case C, the wireless profile WP1 has already been stored in the NFC I/F 30 (e.g., S41 in FIG. 3, and S12 in FIG. 2).

An NFC communication of each of a Polling signal 310, a response signal 312, and the wireless profile WP1 is executed between the printer PR and the portable terminal PT2. The controller 40 of the printer PR starts a connection related process SP1 in response to a predetermined notification 310A (YES in S42, YES in S43, and S44 in FIG. 3), and in the connection related process SP1, causes the operation state of the printer PR to shift from the device state to the G/O state (S52 in FIG. 4) so as to form a first WFDNW. In addition, the controller 40 determines the termination timing of the G/O maintenance period (i.e., the time point 300 (seconds) after the obtaining of the predetermined notification 310A) by starting a count down of the G/O counter GC from 300 (seconds) (NO in S54, YES in S56, and S58).

When 290 (seconds) elapse from the timing of starting the count down of the G/O counter GC (i.e., when the value of the G/O counter GC is 10 (seconds)), an NFC communication of each of a Polling signal 320, a response signal 322, and the wireless profile WP1 is executed between the printer PR and the portable terminal PT1. The controller 40 of the printer PR then starts a connection related process SP2 in response to a predetermined notification 320A (YES in S42, YES in S43, and S44 in FIG. 3). Consequently, there occurs a situation where the two connection related processes SP1, SP2 are performed in parallel. Since the operation state of the printer PR is the G/O state, the controller 40 does not cause the operation state of the printer PR to shift from the device state to the G/O state in the connection related process SP2 (YES in S50 in FIG. 4). At this time point, since the value of the G/O counter GC is 10 (seconds), the controller 40 resets the value of the G/O counter GC from 10 (seconds) into 300 (seconds) and starts a count down of the G/O counter GC in the connection related process SP2 (YES in S54, and S58).

At the time point when the predetermined notification 320A is obtained, the number of CL apparatuses participating in the first WFDNW is zero. As described above, the controller 40, when obtaining the predetermined notification 320A, resets the G/O counter GC from 10 (seconds) into 300 (seconds), and starts a count down of the G/O counter GC. Thereby when the predetermined notification 320A is obtained, the controller 40 can extend the termination timing of the G/O maintenance period so as to determine a new termination timing of the G/O maintenance period (i.e., the time point 300 (seconds) after the obtaining of the predetermined notification 320A).

The communication of a connection request 330 and the establishment of the Wi-Fi connection are then executed between the printer PR and the portable terminal PT1, and additionally, the value of the G/O counter GC is reset from 290 (seconds) into 300 (seconds). The communication of print data 340 is executed between the printer PR and the portable terminal PT1, and then a response signal for a PING signal 350 is not received from the portable terminal PT1, resulting in that the portable terminal PT1 leaves the first WFDNW. The controller 40 of the printer PR determines the termination timing of the G/O maintenance period (i.e., the time point 300 (seconds) after the timing when the number of CL apparatuses becomes zero) by starting a count down of the G/O counter GC from 300 (seconds) (YES in S94, and S96 in FIG. 5).

Supposing that there is adopted a configuration in which the termination timing of the G/O maintenance period is not extended in response to the predetermined notification 320A, the printer PR may receive the connection request 330 from the portable terminal PT1 shortly before the termination timing of the G/O maintenance period arrives (e.g., at the time point when the value of the G/O counter GC is 5 (seconds)). In this case, the termination timing of the G/O maintenance period may arrive (i.e., the value of the G/O counter GC may become zero) before the Wi-Fi connection is established between the printer PR and the portable terminal PT1. In this case, the printer PR shifts from the G/O state to the device state (YES in S82, and S84 in FIG. 5), and hence the printer PR could not establish the Wi-Fi connection with the portable terminal PT1, and could not receive the print data 340 from the portable terminal PT1. In contrast, in the present embodiment, the printer PR extends the termination timing of the G/O maintenance period in response to the predetermined notification 320A so as to determine a new termination timing of the G/O maintenance period. The printer PR can therefore appropriately establish the Wi-Fi connection with the portable terminal PT1 in response to the connection request 330 before the new termination timing of the G/O maintenance period arrives. The printer PR can thereby receive the print data 340 from the portable terminal PT1 and appropriately perform the printing process.

(Case D; FIG. 9)

With reference to FIG. 9, a Case D that follows the case in FIG. 8 will now be described. When 290 (seconds) elapse from the timing of starting the count down of the G/O counter GC (i.e., when the value of the G/O counter GC is 10 (seconds)), a user of the portable terminal PT1 brings the portable terminal PT1 close to the printer PR again. Consequently, an NFC communication of each of a Polling signal 420, a response signal 422, and the wireless profile WP1 is executed between the printer PR and the portable terminal PT1. The controller 40 of the printer PR starts a connection related process SP3 in response to a predetermined notification 420A (YES in S42, YES in S43, and S44 in FIG. 3). Consequently, there occurs a situation where the three connection related processes SP1, SP2, SP3 are performed in parallel. At this time point, since the value of the G/O counter GC is 10 (seconds), the controller 40, in the connection related process SP3, resets the value of the G/O counter GC from 10 (seconds) into 300 (seconds), and starts a count down of the G/O counter GC (YES in S54, and S58).

At the time point when the predetermined notification 420A is obtained, the number of CL apparatuses participating in the first WFDNW is zero. As described above, the controller 40, when obtaining the predetermined notification 420A, resets the G/O counter GC from 10 (seconds) into 300 (seconds), and starts a count down of the G/O counter GC. Thereby the controller 40, when obtaining the predetermined notification 420A, can extend the termination timing of the G/O maintenance period so as to determine a new termination timing of the G/O maintenance period (i.e., the time point 300 (seconds) after the obtaining of the predetermined notification 420A).

The communication of a connection request 430 and the establishment of the Wi-Fi connection are then executed between the printer PR and the portable terminal PT1, and additionally, the value of the G/O counter GC is reset from 290 (seconds) into 300 (seconds). The communication of print data 440 is also executed between the printer PR and the portable terminal PT1, and then a response signal for a PING signal 450 is not received from the portable terminal PT1, resulting in that the portable terminal PT1 leaves the first WFDNW. The controller 40 of the printer PR determines the termination timing of the G/O maintenance period (i.e., the time point 300 (seconds) after the timing when the number of CL apparatuses becomes zero) by starting a count down of the G/O counter GC from 300 (seconds) (YES in S94, and S96 in FIG. 5).

The count down of the G/O counter GC proceeds while there is maintained a situation where the number of CL apparatuses is zero, resulting in that the value of the G/O counter GC becomes zero. In this case, the controller 40 causes the operation state of the printer PR to shift from the G/O state to the device state so as to causes the first WFDNW to disappear (YES in S82, and S84 in FIG. 5). The controller 40 then issues an end event (S86), and completes the three connection related processes SP1, SP2, SP3 (YES in S76 in FIG. 4). The controller 40 supplies a storage instruction 460 that includes a wireless profile WP2 to the NFC I/F 30 (S88 and S90 in FIG. 5).

Supposing that there is adopted a configuration where the termination timing of the G/O maintenance period is not extended in response to the predetermined notification 420A, the printer PR may receive the connection request 430 from the portable terminal PT1 shortly before the termination timing of the G/O maintenance period arrives. In this case, the termination timing of the G/O maintenance period may arrive before the Wi-Fi connection is established between the printer PR and the portable terminal PT1. In this case, the printer PR shifts from the G/O state to the device state (YES in S82, and S84 in FIG. 5), and hence could not establish the Wi-Fi connection with the portable terminal PT1, and could not receive the print data 440 from the portable terminal PT1. In contrast, in the present embodiment, the printer PR extends the termination timing of the G/O maintenance period in response to the predetermined notification 420A so as to determine a new termination timing of the G/O maintenance period. The printer PR can therefore appropriately establish the Wi-Fi connection with the portable terminal PT1 in response to the connection request 430 before the new termination timing of the G/O maintenance period arrives. The printer PR can thereby receive the print data 440 from the portable terminal PT1, and appropriately perform the printing process.

(Correspondence Relation)

The printer PR and the portable terminal PT1 are examples of the "communication apparatus" and the "particular external apparatus", respectively. The CPU 42, the main memory 44, the program PG, the wireless LAN I/F 20, and the NFC I/F 30 are examples of the "computer", the "memory", the "computer-readable instructions", the "first interface", and the "second interface", respectively. The G/O counter GC, 300 (seconds), and zero are examples of the "time counter", the "initial value", and the "predetermined value", respectively. The first WFDNW is an example of the "first wireless network". The device state, the G/O state, the G/O apparatus, and the CL apparatus are examples of the "non-belonging state", the "parent state", the "parent station", and the "child station", respectively. The device state and the G/O state are also examples of the "first state" and the "second state", respectively. Each of making a YES determination in S42 and making a YES determination in S43 in FIG. 3 is an example of "detecting a predetermined instruction". Each of the Polling signal, the Read signal, and the confirmation signal is an example of the "predetermined signal".

In FIGS. 7 to 9, each of the print data 240, 340, 440 is an example of the "target data". Each of the termination timings of the G/O maintenance period that are determined in response to the predetermined notifications 110A, 210A, 310A in FIGS. 6 to 8, and the termination timing of the G/O maintenance period that is determined when the number of CL apparatuses becomes zero in FIGS. 7 to 9, is an example of the "termination timing of a maintenance period". Each of the termination timings of the G/O maintenance period that are extended in response to the predetermined notifications 320A, 420A in FIGS. 8 and 9 is an example of the "new termination timing of the maintenance period". Each of the termination timings of the G/O maintenance period that are determined in response to the predetermined notifications 110A, 210A, 310A in FIGS. 6 to 8 is an example of the "first termination timing of the maintenance period". The termination timing of the G/O maintenance period that is determined when the number of CL apparatuses becomes zero in FIGS. 7 to 9 is an example of the "second termination timing of the maintenance period". The storage instruction 100 in FIG. 6 is an example of the "first storage instruction". Each of the storage instruction 160 in FIG. 6, the storage instruction 260 in FIG. 7, and the storage instruction 460 in FIG. 9 is an example of the "second storage instruction".

(Variation 1)

In S52 in FIG. 4, the CPU 42 of the printer PR forms the WFDNW by causing the state of the printer PR to shift from the device state to the G/O state in the WFD scheme. As an alternative to this, the CPU 42 may form a wireless network in which the printer PR operates as an AP (an abbreviation for an Access Point) by activating a so-called SoftAP. In the present variation, in S40 in FIG. 3 and in S88 in FIG. 5, the CPU 42 prepares a wireless profile (an SSID, a password, etc.) to be used in the wireless network. In S62 in FIG. 4, the CPU 42 establishes a wireless connection with the portable terminal via the wireless LAN I/F 20 in order to cause the portable terminal to participate in the wireless network. In the present variation, a state in which the SoftAP is not activated, and a state in which the SoftAP is activated are examples of the "non-belonging state" and the "parent state", respectively. The printer PR operating as an AP, and the portable terminal establishing a wireless connection with the printer PR that operates as an AP, are examples of the "parent station" and the "child station", respectively.

(Variation 2)

In the above-described embodiment, each of making a YES determination in S42 and making a YES determination in S43, in FIG. 3, is an example of "detecting a predetermined instruction". As an alternative to this, for example, the CPU 42 may detect the "predetermined instruction" in response to an operation for establishing the Wi-Fi connection with the portable terminal being performed by the user on the operating unit 12. Alternatively, for example, the CPU 42 may detect the "predetermined instruction" in response to receiving of the connection request from the portable terminal via the wireless LAN I/F 20. As in the above-described embodiment and the present variation, the "predetermined instruction" may be, for example, an instruction related to the establishment of a wireless connection with an external apparatus via the first interface. Note that the content of the "predetermined instruction" is not particularly limited, as long as the "predetermined instruction" is an instruction that may be a trigger for extending the first maintenance period.

(Variation 3)

In the above-described embodiment, the CPU 42, in the case of making a YES determination in S42 and making a YES determination in S43 in FIG. 3, causes the operation state of the printer PR to shift from the device state to the G/O state and forms the WFDNW (S52) in the connection related process in FIG. 4. As an alternative to this, the CPU 42, in the case where an operation for causing the printer PR to shift to the G/O state is performed by a user on the operating unit 12, for example, may cause the operation state of the printer PR to shift from the device state to the G/O state and form the WFDNW. Namely, the timing when the operation state of the communication apparatus is changed from the non-belonging state into the parent state may be, as in the above-described embodiment, the timing when the predetermined instruction is detected, or may be, as in the present variation, the timing not related to the detection of the predetermined instruction.

(Variation 4)

In the above-described embodiment, it is assumed that the NFC I/F 30 of the printer PR receives all the three types of signals, namely, the Polling signal (S20 in FIG. 2), the Read signal (S23), and the confirmation signal (S30) from the portable terminal (e.g., the PT1). However, note that whether all the three types of signals described above are sent or not depends on the portable terminal. For example, the portable terminal may send a Polling signal in place of a confirmation signal, and in this case, the NFC I/F 30 of the printer PR receives a Polling signal and a Read signal from the portable terminal, but does not receive a confirmation signal. In the present variation, each of the Polling signal and the Read signal is an example of the "predetermined signal". In another variation, only one type of the signal (e.g., the Polling signal) out of the three types of signals described above may be an example of the "predetermined signal".

(Variation 5)

The NFC I/F 30 of the printer PR may not supply a predetermined notification to the controller 40 even if it receives each of the signals described in the Variation 4. The NFC I/F 30 may supply a predetermined notification to the controller 40 in the case, for example, where a magnetic field in the neighborhood of the NFC I/F 30 changes due to the fact that the situation in which the device distance between the NFC I/F 30 and the NFC I/F of the portable terminal is greater than the predetermined distance changes into the situation in which the device distance is equal to or less than the predetermined distance. Namely, the "second interface" may supply a predetermined notification to the controller in the case where the first situation changes into the second situation.

(Variation 6)

The NFC I/F 30 of the printer PR may not be the NFC Forum Tag, and may be the NFC Forum Device. In this case, a Variation 6-1 and a Variation 6-2 described below may be adopted.

(Variation 6-1)

The NFC I/F 30, for example, may supply a predetermined notification to the controller 40 after establishing an NFC session with the portable terminal in response to the receiving of the predetermined signal from the portable terminal. The present variation is also an example of "supplies the predetermined notification to the computer when a predetermined signal is received from the external apparatus". Note that in the present variation, the NFC I/F 30 may supply a predetermined notification to the controller 40 before sending a wireless profile to the portable terminal, or may supply a predetermined notification to the controller 40 after sending a wireless profile to the portable terminal.

(Variation 6-2)

The CPU 42 of the printer PR may not perform S40 and S41 in FIG. 3, and S88 and S90 in FIG. 5. In this case, the CPU 42 of the printer PR may prepare a wireless profile after obtaining a predetermined notification from the NFC I/F 30, and supply the wireless profile to the NFC I/F 30. Namely, the wireless profile may not be prestored in the I/F memory 34 before the NFC session with the portable terminal is established. In the present variation, "supplying . . . a first (or second) storage instruction" can be omitted.

(Variation 7)

The printer PR may include, in place of the NFC I/F 30, a wireless interface for executing a wireless communication in accordance with other short-range wireless communication schemes (e.g., the TransferJet scheme, the Bluetooth (Trademark) scheme, etc.). Generally speaking, the predetermined distance, which is the maximum distance for executing a wireless communication via the second interface, only has to be less than the maximum distance for executing a wireless communication via the first interface.

(Variation 8)

The G/O counter GC may not make a count down from an initial value of 300 (seconds), and may make a count up from an initial value of zero, for example. In the present variation, zero and 300 (seconds) are examples of the "initial value" and the "predetermined value", respectively. Note that the "predetermined value" may be a value other than 300 (seconds) (e.g., 100 (seconds), 500 (seconds), etc.).

(Variation 9)

In the above-described embodiment, in the Case C in FIG. 8, for example, the CPU 42 of the printer PR determines the G/O maintenance period when the portable terminal PT1 leaves the first WFDNW and the number of CL apparatuses participating in the first WFDNW becomes zero. As an alternative to this, the CPU 42 may not determine the G/O maintenance period even if the number of CL apparatuses becomes zero. Namely, the CPU 42 may shift from the G/O state to the device state and cause the first WFDNW to disappear immediately after the number of CL apparatuses becomes zero. Namely, the "second maintenance period" may not be provided. Although the CPU 42 determines the G/O maintenance period when the number of CL apparatuses becomes zero, the CPU 42 may not adopt the configuration in which the G/O maintenance period is extended. Namely, the "second maintenance period" may not be extended.

(Variation 10)

In the above-described embodiment, in S52 in FIG. 4, the CPU of the printer PR causes the printer PR to shift autonomously to the G/O state, and forms a WFDNW in which the number of CL apparatuses is zero. As an alternative to this, there may be adopted a configuration in which the printer PR and the portable terminal perform a G/O negotiation in the WFD scheme. Specifically, the printer PR includes the following configuration. The wireless LAN I/F 20 has its operation state changed between a valid state and an invalid state. The valid state is a state in which the CPU 42 can perform the G/O negotiation via the wireless LAN I/F 20, while the invalid state is a state in which the CPU 42 cannot perform the G/O negotiation via the wireless LAN I/F 20. In another expression, the valid state is a state in which power is supplied to the wireless LAN I/F 20 and the CPU 42 can execute the wireless communication via the wireless LAN I/F 20, while the invalid state is a state in which no power is supplied to the wireless LAN I/F 20 and the CPU 42 cannot execute the wireless communication via the wireless LAN I/F 20. In place of S50 and S52 in FIG. 4, the following process is performed. Namely, in S50, the CPU 42 determines whether the wireless LAN I/F 20 is in the valid state or in the invalid state. The CPU 42, when determining that the wireless LAN I/F 20 is in the invalid state (YES in S50), changes the wireless LAN I/F 20 from the invalid state into the valid state in S52 and proceeds to S54, and when determining that the wireless LAN I/F 20 is in the valid state (NO in S50), skips S52 and proceeds to S54.

The memory 44 of the printer PR includes, in place of the G/O counter GC, a valid state counter for maintaining the operation state of the wireless LAN I/F 20 in the valid state. In S54 to S58, S64, and S66 in FIG. 4, the CPU 42 performs a process related to the valid state counter, in place of the process related to the G/O counter GC. Accordingly, the CPU 42, in the case of obtaining a predetermined notification from the NFC I/F 30 under the situation where the valid state counter is making a count (YES in S54), resets the valid state counter and starts a count down (S58). Namely, the termination timing of the valid state maintenance period for maintaining the operation state of the wireless LAN I/F 20 in the valid state is extended, and a new termination timing of the valid state maintenance period is determined. In S62, the CPU 42 performs, with the portable terminal, the G/O negotiation in the WFD scheme, and determines whether the printer PR should operate in the G/O state or in the CL state. The CPU 42, in the case of determining that the printer PR should operate in the G/O state, causes the printer PR to shift from the device state to the G/O state, establishes a Wi-Fi connection with the portable terminal in the CL state, and forms a WFDNW in which the printer PR is a G/O apparatus. The CPU 42, in the case of determining that the printer PR should operate in the CL state, causes the printer PR to shift from the device state to the CL state, to establish a Wi-Fi connection with the portable terminal in the G/O state, and to participate in a WFDNW in which the portable terminal is a G/O apparatus. Note that if the printer PR operates in the CL state, the process in S74 in FIG. 4 is not performed.

In place of the process in FIG. 5, the following process is performed. Namely, the CPU 42 monitors the valid state counter becoming 0 (second), and in the case where the valid state counter becomes 0 (second), changes the operation state of the wireless LAN I/F 20 from the valid state into the invalid state. Accordingly, there arises a state in which the wireless communication via the wireless LAN I/F 20 is not executable, and hence the CPU 42 cannot receive a connection request from the portable terminal via the wireless LAN I/F 20, and consequently, cannot establish a Wi-Fi connection with the portable terminal. The CPU 42 then issues an end event as in S86 in FIG. 5.

As described above, in the present variation, the printer PR changes the operation state of the wireless LAN I/F 20 from the valid state into the invalid state when the termination timing of the valid state maintenance period arrives. No power is thereby supplied to the wireless LAN I/F 20, and hence the power consumption of the printer PR can be reduced appropriately. The printer PR extends the termination timing of the valid state maintenance period in response to the predetermined notification, and determines a new termination timing of the valid state maintenance period. The printer PR can therefore perform the G/O negotiation in response to the connection request before the new termination timing of the valid state maintenance period arrives, and appropriately establish the Wi-Fi connection with the portable terminal. The printer PR thus can receive the print data from the portable terminal and appropriately perform the printing process. In the present variation, the invalid state and the valid state are examples of the "first state" and the "second state", respectively. The valid state counter is an example of the "time counter".

(Variation 11)

The "communication apparatus" may not be the printer PR, and may be a scanner, for example. In the present variation, a scanner, for example, may include an NFC I/F and a wireless LAN I/F, as in the above-described embodiment. The NFC OF stores a wireless profile, and may send the wireless profile to the portable terminal. The CPU of the scanner, in the case where the portable terminal participates, as a CL apparatus, in the WFDNW in which the scanner is a G/O apparatus, may send scanned data to the portable terminal by using the WFDNW. In the present variation, the scanned data is an example of the "target data". The "communication apparatus" may also be an apparatus different from the printer PR and the scanner (e.g., a PC, a copy machine, a multifunctional machine, a server, a portable terminal, etc.).

(Variation 12)

The "external apparatus" is not limited to the portable terminals PT1, PT2, and may also be a PC, a printer, a scanner, a copy machine, a multifunctional machine, a server, etc.).

(Variation 13)

In the above-described embodiment, each of the processes in FIGS. 3-5 is implemented by the CPU 42 of the printer PR executing a program PG (i.e., software) in the main memory 44. As an alternative to this, at least one of these processes may be implemented by a hardware such as a logic circuit, etc.

The invention claimed is:

1. A communication apparatus comprising:
    a first communication interface configured to execute a wireless communication;
    a computer; and
    a memory that stores computer-readable instructions, wherein the computer-readable instructions, when executed by the computer, cause the communication apparatus to perform:
    detecting a first predetermined instruction for forming a wireless network to which the communication apparatus and a first external apparatus are to belong,
    in response to detecting the first predetermined instruction, forming a first wireless network by changing an operation state of the communication apparatus from a non-belonging state to a parent state, the non-belonging state being a state in which the communication apparatus does not belong to a wireless network, the parent state being for operating as a parent station of the first wireless network for executing a wireless communication via the first communication interface, a number of child apparatuses being zero at a timing of the first wireless network being formed;
    before a wireless connection with the first external apparatus is established, determining, when the first wireless network is formed, a termination timing of a maintenance period for maintaining the operation state of the communication apparatus in the parent state in a situation where the number of child apparatuses is zero, a child apparatus being an apparatus which is participating in the first wireless network as a child station;
    when the termination timing of the maintenance period arrives in a situation where the number of the child apparatuses remains zero since the first wireless network was formed, causing the first wireless network to disappear by changing the operation state of the communication apparatus from the parent state to the non-belonging state;

forming the first wireless network to which the communication apparatus and the first external apparatus belong by the first external apparatus participating in the first wireless network as the child station before the termination timing of the maintenance period arrives;

executing a wireless communication of target data with the first external apparatus via the first communication interface by using the first wireless network to which the communication apparatus and the first external apparatus belong after the first wireless network to which the communication apparatus and the first external apparatus belong has been formed;

detecting a second predetermined instruction for forming a wireless network to which the communication apparatus and a second external apparatus are to belong before the termination timing of the maintenance period arrives in the situation where the number of the child apparatuses remains zero since the first wireless network was formed;

in response to detecting the second predetermined instruction, extending, before a wireless connection with the second external apparatus is established, the termination timing of the maintenance period so as to determine a new termination timing of the maintenance period;

when the new termination timing of the maintenance period arrives in the situation where the number of the child apparatuses remains zero since the first wireless network was formed, causing the first wireless network to disappear by changing the operation state of the communication apparatus from the parent state to the non-belonging state;

forming the first wireless network to which the communication apparatus and the second external apparatus belong by the second external apparatus participating in the first wireless network as the child station before the new termination timing of the maintenance period arrives; and executing a wireless communication of target data with the second external apparatus via the first communication interface by using the first wireless network to which the communication apparatus and the second external apparatus belong after the first wireless network to which the communication apparatus and the second external apparatus belong has been formed.

2. The communication apparatus as in claim 1, wherein the forming of the first wireless network with the number of child apparatuses being zero is performed by changing the operation state of the communication apparatus from the non-belonging state to the parent state, when the first predetermined instruction is detected in a situation where the operation state of the communication apparatus is the non-belonging state.

3. The communication apparatus as in claim 1, wherein the determining of the termination timing of the maintenance period includes determining, when the number of child apparatuses becomes zero from a situation where the number of child apparatuses is one or more, a termination timing of a second maintenance period for maintaining the operation state of the communication apparatus in the parent state in the situation where the number of child apparatuses is zero.

4. The communication apparatus as in claim 1, further comprising:

a second communication interface configured to execute a wireless communication, wherein a predetermined distance which is a maximum distance for executing the wireless communication via the second communication interface is less than a maximum distance for executing the wireless communication via the first communication interface, wherein the second communication interface sends a first wireless profile to an external apparatus, in a case of changing from a first situation in which a device distance is greater than the predetermined distance to a second situation in which the device distance is equal to or less than the predetermined distance, the first wireless profile being a profile to be used in the first wireless network, the device distance being a distance between the second communication interface and the external apparatus, wherein the second communication interface further supplies a predetermined notification to the computer in the case of changing from the first situation to the second situation, and wherein the first predetermined instruction is detected in response to obtaining the predetermined notification from the second communication interface.

5. The communication apparatus as in claim 4, wherein the computer-readable instructions, when executed by the computer, cause the communication apparatus to further perform:

before the first wireless network with the number of child apparatuses being zero is formed, supplying to the second communication interface a first storage instruction for storing the first wireless profile in the second communication interface.

6. The communication apparatus as in claim 5, wherein the computer-readable instructions, when executed by the computer, cause the communication apparatus to further perform:

after the first wireless network disappears and before a second wireless network is formed, supplying to the second communication interface a second storage instruction for storing, in place of the first wireless profile, a second wireless profile in the second communication interface, the second wireless network being a network in which the communication apparatus is to operate as a parent station, the second wireless profile being a profile to be used in the second wireless network.

7. The communication apparatus as in claim 4, wherein the second communication interface supplies the predetermined notification to the computer when a predetermined signal is received from the external apparatus due to changing from the first situation to the second situation.

8. The communication apparatus as in claim 1, wherein the determining of the termination timing of the maintenance period includes starting a count of a time counter from an initial value, the extending of the termination timing of the maintenance period includes, when the second predetermined instruction is detected, resetting a value of the time counter to the initial value and restarting a count of the time counter from the initial value, and the termination timing of the maintenance period arrives when a value of the time counter is identical to a predetermined value.

9. The communication apparatus as in claim 8, wherein the computer-readable instructions, when executed by the computer, cause the communication apparatus to further perform:

stopping a count of the time counter in a case where the first external apparatus participates in the first wireless network as the child station before the termination timing of the maintenance period arrives.

10. The communication apparatus as in claim 1, wherein the first wireless network with the number of child apparatuses being zero is formed by autonomously changing the operation state of the communication apparatus from the non-belonging state to the parent state without executing a negotiation with the first external apparatus.

11. A communication apparatus comprising:

a first communication interface configured to execute a wireless communication;

a computer;

a second communication interface configured to execute a wireless communication, wherein a predetermined distance which is a maximum distance for executing the wireless communication via the second communication interface is less than a maximum distance for executing the wireless communication via the first communication interface, the second communication interface sending a first wireless profile to an external apparatus, in a case of changing from a first situation in which a device distance is greater than the predetermined distance to a second situation in which the device distance is equal to or less than the predetermined distance, the first wireless profile being a profile to be used in a first wireless network, the device distance being a distance between the second communication interface and the external apparatus, the second communication interface further supplying a predetermined notification to the computer in the case of changing from the first situation to the second situation; and a memory that stores computer-readable instructions, wherein the computer-readable instructions, when executed by the computer, cause the communication apparatus to perform:

in a case where an operation state of the communication apparatus is a second state which is different from a first state, determining a termination timing of a maintenance period for maintaining the operation state of the communication apparatus in the second state;

when the termination timing of the maintenance period arrives, changing the operation state of the communication apparatus from the second state to the first state;

in a case where the first wireless network to which both the communication apparatus and a particular external apparatus belong is formed before the termination timing of the maintenance period arrives, executing a wireless communication of target data with the particular external apparatus via the first communication interface by using the first wireless network;

detecting a predetermined instruction in response to obtaining the predetermined notification from the second communication interface; and when the predetermined instruction is detected before the termination timing of the maintenance period arrives, extending the termination timing of the maintenance period so as to determine a new termination timing of the maintenance period, the communication apparatus does not detect the predetermined instruction even if the predetermined notification is obtained again from the second communication interface before a predetermined time elapses from a timing of detecting the predetermined instruction in response to obtaining the predetermined notification from the second communication interface.

12. The communication apparatus as in claim 11, wherein the computer-readable instructions, when executed by the computer, cause the communication apparatus to further perform:

before the first wireless network is formed, supplying to the second communication interface a first storage instruction for storing the first wireless profile in the second communication interface.

13. The communication apparatus as in claim 12, wherein the computer-readable instructions, when executed by the computer, cause the communication apparatus to further perform:

after the first wireless network disappears and before a second wireless network is formed, supplying to the second communication interface a second storage instruction for storing, in place of the first wireless profile, a second wireless profile in the second communication interface, the second wireless network being a network in which the communication apparatus is to operate as a parent station, the second wireless profile being a profile to be used in the second wireless network.

14. The communication apparatus as in claim 11, wherein the second communication interface supplies the predetermined notification to the computer when a predetermined signal is received from the external apparatus due to changing from the first situation to the second situation.

15. The communication apparatus as in claim 11, wherein the determining of the termination timing of the maintenance period includes starting a count of a time counter from an initial value, the extending of the termination timing of the maintenance period includes, when the predetermined instruction is detected, resetting a value of the time counter to the initial value and restarting a count of the time counter from the initial value, and the termination timing of the maintenance period arrives when a value of the time counter is identical to a predetermined value.

16. The communication apparatus as in claim 15, wherein the computer-readable instructions, when executed by the computer, cause the communication apparatus to further perform:

stopping a count of the time counter in a case where the particular external apparatus participates in the first wireless network as a child station before the termination timing of the maintenance period arrives.

17. A non-transitory computer-readable medium storing computer-readable instructions for a communication apparatus, wherein the computer-readable instructions, when executed by a computer of the communication apparatus, cause the communication apparatus to perform:

detecting a first predetermined instruction for forming a wireless network to which the communication apparatus and a first external apparatus are to belong, in response to detecting the first predetermined instruction, forming a first wireless network by changing an operation state of the communication apparatus from a non-belonging state to a parent state, the non-belonging state being a state in which the communication apparatus does not belong to a wireless network, the parent state being for operating as a parent station of the first wireless network for executing a wireless communication via a first communication interface, a number of child apparatuses being zero at a timing of the first wireless network being formed;

before a wireless connection with the first external apparatus is established, determining, when the first wireless network is formed, a termination timing of a maintenance period for maintaining the operation state of the communication apparatus in the parent state in a situation where the number of child apparatuses is zero, a child apparatus being an apparatus which is participating in the first wireless network as a child station;

when the termination timing of the maintenance period arrives in a situation where the number of the child apparatuses remains zero since the first wireless network was formed, causing the first wireless network to disappear by changing the operation state of the communication apparatus from the parent state to the non-belonging state;

forming the first wireless network to which the communication apparatus and the first external apparatus belong by the first external apparatus participating in the first wireless network as the child station before the termination timing of the maintenance period arrives;

executing a wireless communication of target data with the first external apparatus via the first communication interface by using the first wireless network to which the communication apparatus and the first external apparatus belong after the first wireless network to which the communication apparatus and the first external apparatus belong has been formed;

detecting a second predetermined instruction for forming a wireless network to which the communication apparatus and a second external apparatus are to belong before the termination timing of the maintenance period arrives in the situation where the number of the child apparatuses remains zero since the first wireless network was formed;

in response to detecting the second predetermined instruction, extending, before a wireless connection with the second external apparatus is established, the termination timing of the maintenance period so as to determine a new termination timing of the maintenance period;

when the new termination timing of the maintenance period arrives in the situation where the number of the child apparatuses remains zero since the first wireless network was formed, causing the first wireless network to disappear by changing the operation state of the communication apparatus from the parent state to the non-belonging state;

forming the first wireless network to which the communication apparatus and the second external apparatus belong by the second external apparatus participating in the first wireless network as the child station before the new termination timing of the maintenance period arrives; and executing a wireless communication of target data with the second external apparatus via the first communication interface by using the first wireless network to which the communication apparatus and the second external apparatus belong after the first wireless network to which the communication apparatus and the second external apparatus belong has been formed.

18. A non-transitory computer-readable medium storing computer-readable instructions for a communication apparatus, wherein the computer-readable instructions, when executed by a computer of the communication apparatus, cause the communication apparatus to perform:

in a case where an operation state of the communication apparatus is a second state which is different from a first state, determining a termination timing of a maintenance period for maintaining the operation state of the communication apparatus in the second state;

when the termination timing of the maintenance period arrives, changing the operation state of the communication apparatus from the second state to the first state;

in a case where a first wireless network to which both the communication apparatus and a particular external apparatus belong is formed before the termination timing of the maintenance period arrives, executing a wireless communication of target data with the particular external apparatus via a first communication interface of the communication apparatus by using the first wireless network;

detecting a predetermined instruction in response to obtaining a predetermined notification from a second communication interface, the predetermined notification being supplied from the second communication interface in a case of changing from a first situation in which a device distance between the second communication interface and an external apparatus is greater than a predetermined distance to a second situation in which a device distance is greater than the predetermined distance, the predetermined distance being a maximum distance for executing a wireless communication via the second communication interface and less than a maximum distance for executing the wireless communication via a first communication interface; and when the predetermined instruction is detected before the termination timing of the maintenance period arrives, extending the termination timing of the maintenance period so as to determine a new termination timing of the maintenance period, and if the predetermined notification is obtained again from the second communication interface before a predetermined time elapses from a timing of detecting the predetermined instruction in response to obtaining the predetermined notification from the second communication interface, not detecting the predetermined instruction.

19. A communication apparatus comprising:

a first communication interface configured to execute a wireless communication;

a computer;

a second communication interface configured to execute a wireless communication, wherein a predetermined distance which is a maximum distance for executing the wireless communication via the second communication interface is less than a maximum distance for executing the wireless communication via the first communication interface, the second communication interface sending a first wireless profile to an external apparatus, in a case of changing from a first situation in which a device distance is greater than the predetermined distance to a second situation in which the device distance is equal to or less than the predetermined distance, the first wireless profile being a profile to be used in a first wireless network, the device distance being a distance between the second communication interface and the external apparatus, the second communication interface further supplying a predetermined notification to the computer in the case of changing from the first situation to the second situation; and a memory that stores computer-readable instructions, wherein the computer-readable instructions, when executed by the computer, cause the communication apparatus to perform:

in a case where an operation state of the communication apparatus is a parent state and a number of child apparatuses is zero, determining a termination timing of a maintenance period for maintaining the operation state of the communication apparatus in the parent state in a situation where the number of child apparatuses is zero, the parent state being for operating as a parent station of the first wireless network for executing a wireless communication via the first communication interface, a child apparatus being an apparatus which is participating in the first wireless network as a child station;

when the termination timing of the maintenance period arrives, causing the first wireless network to disappear by changing the operation state of the communication apparatus from the parent state to a non-belonging state in which the communication apparatus does not belong to a wireless network;

in a case where a particular external apparatus participates in the first wireless network as the child station before the termination timing of the maintenance period arrives, executing a wireless communication of target data with the particular external apparatus via the first communication interface by using the first wireless network;

detecting a predetermined instruction in response to obtaining the predetermined notification from the second communication interface; and when the predetermined instruction is detected before the termination timing of the maintenance period arrives, extending the termination timing of the maintenance period so as to determine a new termination timing of the maintenance period, wherein the communication apparatus does not detect the predetermined instruction even if the predetermined notification is obtained again from the second communication interface before a predetermined time elapses from a timing of detecting the predetermined instruction in response to obtaining the predetermined notification from the second communication interface.

* * * * *